United States Patent
Chavali et al.

(10) Patent No.: US 9,537,702 B2
(45) Date of Patent: Jan. 3, 2017

(54) METHOD AND APPARATUS FOR IDENTIFYING CHANNEL BANDWIDTH AND CHANNEL OFFSET OF AN ORTHOGONAL FREQUENCY DIVISION MULTIPLEXING SIGNAL

(71) Applicant: Uurmi Systems Private Limited, Hyderabad (IN)

(72) Inventors: Nanda Kishore Chavali, Hyderabad (IN); Syed Zeeshan Ismail, Hyderabad (IN)

(73) Assignee: Uurmi Systems Private Limited, Hyderabad, IN (US)

(*) Notice: Subject to any disclaimer, the term of this patent is extended or adjusted under 35 U.S.C. 154(b) by 113 days.

(21) Appl. No.: 14/521,835

(22) Filed: Oct. 23, 2014

(65) Prior Publication Data
US 2016/0119174 A1    Apr. 28, 2016

(51) Int. Cl.
*H04L 27/26*    (2006.01)
*H04L 5/00*    (2006.01)

(52) U.S. Cl.
CPC ....... *H04L 27/2672* (2013.01); *H04L 27/2659* (2013.01); *H04L 27/2666* (2013.01); *H04L 5/001* (2013.01)

(58) Field of Classification Search
CPC ............. H04W 72/00; H04W 72/0446; H04W 72/0453; H04L 27/2659; H04L 27/2666; H04L 27/2672; H04L 5/001
See application file for complete search history.

(56) References Cited

U.S. PATENT DOCUMENTS

| | | | |
|---|---|---|---|
| 8,451,808 B2* | 5/2013 | Solomon | H04W 36/0055 370/328 |
| 2011/0075759 A1* | 3/2011 | Seok | H04W 80/02 375/295 |
| 2011/0096747 A1* | 4/2011 | Seok | H04W 72/04 370/329 |
| 2011/0110349 A1* | 5/2011 | Grandhi | H04W 28/18 370/338 |
| 2012/0224612 A1* | 9/2012 | Kim | H04L 1/0003 375/219 |
| 2015/0103713 A1* | 4/2015 | Lee | H04W 52/0235 370/311 |

* cited by examiner

Primary Examiner — Samina Choudhry
Assistant Examiner — Peter Chen
(74) Attorney, Agent, or Firm — Next ip Law Group

(57) ABSTRACT

Methods, apparatuses and systems for identifying a channel bandwidth and channel offset of an orthogonal frequency division multiplexing (OFDM) signal. The OFDM signal is received by a receiver apparatus that may be tuned to RF bandwidth of 20 MHz, 40 MHz or 80 MHz. The method utilized by the apparatus includes identifying the location of the primary channel and subsequently determining a sequence of equalized frequency domain sub-symbols of the signal field in the lower and the upper frequency band. Further, a cross-correlation between the sequence of equalized frequency domain sub-symbols is computed along with the computing energy of the sequence of equalized frequency domain sub-symbols. Finally, the cross-correlation and the computed energy are compared for identifying the channel offset and the channel bandwidth.

19 Claims, 13 Drawing Sheets

| L-STF | L-LTF | L-SIG | L-Data |

FIG. 4A

| L-STF | L-LTF | L-SIG | HT-SIG | HT-STF | HT-LTF | HT-Data |

FIG. 4B

| HT-STF | HT-LTF | HT-SIG | HT-SIG | HT-Data |

FIG. 4C

| L-STF | L-LTF | L-SIG | VHT-SIG-A | VHT-STF | VHT-LTF | VHT-SIG-B | VHT-Data |

FIG. 4D

METHOD AND APPARATUS FOR IDENTIFYING CHANNEL BANDWIDTH AND CHANNEL OFFSET OF AN ORTHOGONAL FREQUENCY DIVISION MULTIPLEXING SIGNAL

FIELD OF THE INVENTION

The presently disclosed embodiments are generally related to wireless communication systems, and more particularly to receiver apparatuses and related methods for determining a channel bandwidth and channel offset of a received orthogonal frequency division multiplexing signal.

BACKGROUND

A wireless communication system comprises of at least a transmitting apparatus and a receiving apparatus. The transmitting apparatus contains one or more antennas for transmitting one or more signals after modulating one or more baseband sub-symbols. The sub-symbols may be modulated by using modulation schemes such as PSK, QAM, and the like. The transmitting apparatus scans the available spectrum and then transmits the signal with a particular channel bandwidth for efficiently utilizing the available spectrum. A multiplexing technique such as orthogonal frequency division multiplexing also known as OFDM may be utilized to achieve higher data rate and to mitigate defects such as inter-symbol interference and fading caused due to multipath delay spread. The receiving apparatus on the other side receives the OFDM modulated signal and thereupon identifies the channel bandwidth of the transmitted signal and demodulates the received signal into a plurality of individual PSK/QAM sub-symbol. The transmitting apparatus and the receiving apparatus communicate with each other based on various protocols and specifications including IEEE 802.11, Bluetooth, Advanced Mobile Phone System (AMPS), Global System for Mobile Communications (GSM), Code division multiple access (CDMA), Local Multipoint Distribution Service (LMDS), Multichannel Multipoint Distribution Service (MMDS), and the like.

In recent past, the IEEE 802.11 and its various versions commonly known as Wi-Fi have emerged as one of the most prominent wireless technologies for creating a wireless local area network (WLAN). The IEEE 802.11 standards also play an important role in the future fourth-generation wireless and mobile communication systems. The development of 802.11a standard introduced orthogonal frequency division multiplexing (OFDM) to 802.11 standards, with data rates up to 54 Mbps in 20 MHz channel bandwidth. Subsequently, the 802.11g amendment incorporated the 802.11a OFDM PHY in the 2.4 GHz band. With the adoption of each new PHY, 802.11 standards have experienced a five-fold increase in data rate. This rate of increase continues with High Throughput (HT) IEEE 802.11n with a data rate of 300 Mbps and 600 Mbps in 20 MHz and 40 MHz channel bandwidth respectively.

To meet the increasing demand for higher throughput, the IEEE 802.11ac standard has been developed for facilitating Very High Throughput (VHT) wireless LAN. IEEE 802.11ac enhances the data rate beyond 1 Gbps in 5 GHz band and supports 80 MHz channel bandwidth option. IEEE 802.11ac supports 80 MHz channel bandwidth option in addition to 40 MHz and 20 MHz channel bandwidth options of IEEE 802.11n and IEEE 802.11a. Moreover, IEEE802.11n/ac introduces a channel bonding technique for efficient utilization of the spectrum. In channel bonding technique, available channel bandwidth i.e. 20 MHz or 40 MHz or 80 MHz is efficiently utilized either by using full channel bandwidth or partial bandwidth of the total channel bandwidth depending upon the availability of the spectrum. For instance, in case of 40 MHz channel bandwidth, two 20 MHz channels are bonded together. One of the 20 MHz channel is called a primary channel and the other 20 MHz channel is called a secondary channel. IEEE 802.11n/ac recommends different modes of channel offset to transmit PHY Protocol Data Unit (PPDU) independently in primary channel or by combination of primary and secondary channel by channel bonding technique. The 20 MHz channel bandwidth has only one mode of channel offset called CH_OFF_20. The 40 MHz channel bandwidth has five modes of channel offsets namely CH_OFF_20, CH_OFF_40, CH_OFF_40_NON_HT_DUP, CH_OFF_20U and CH_OFF_20L. Further, for 80 MHz channel bandwidth there exist seven possible modes of channels offset namely CH_OFF_20, CH_OFF_40, CH_OFF_40_NON_HT_DUP, CH_OFF_20U, CH_OFF_20L, CH_OFF_80 and CH_OFF_80_NON_HT_DUP.

At the receiver end, IEEE 802.11 ac compliant receiver apparatus is tuned to operate in one of the three RF bandwidths i.e. 20 MHz, 40 MHz or 80 MHz. While the receiving apparatus receives a radio signal, identifying the proper channel bandwidth and channel offset used by transmitted orthogonal frequency division multiplexing (OFDM) signal is crucial for successfully decoding a data packet. Thus, it is necessary to determine the channel bandwidth and channel offset of the received radio signal and perform demodulation according to the relevant channel bandwidth and channel offset. The traditional methods of channel bandwidth and channel offset identification used by receiver apparatuses are based on estimating frequency and timing offsets in each of the primary channel and secondary channel. The estimation algorithms provided by the present state of art are performed before channel equalization, due to which performance of these identification/estimation algorithms are highly vulnerable to frequency selectivity of the channel.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure is generally directed to methods and systems for determining a channel bandwidth and a channel offset of a received orthogonal frequency division multiplexing (OFDM) signal. The embodiments herein are directed to receiving apparatuses and methods utilized for determining a channel bandwidth and a channel offset of the received signal, however, specific components of the apparatus and method required for identification of the channel bandwidth and channel offset of an OFDM signal may be utilized in a transmitting apparatus or any other apparatus needing the identification of channel offset or channel bandwidth.

In an embodiment, there is provided a receiver apparatus for receiving and identifying channel bandwidth and channel offset of an orthogonal frequency division multiplexing signal when the receiver is tuned to operate using radio frequency (RF) bandwidths namely 20 MHz or 40 MHz. The receiver apparatus comprises of at least a receiving unit and a Bandwidth identification module. The receiving unit is configured for receiving one or more signals, wherein each of the one or more signals have an associated center frequency index, a primary channel frequency index and a PHY protocol data unit. In an aspect, the PHY protocol data unit comprises of a training field, a signal field and a data field. The Bandwidth identification module is configured for identifying the channel bandwidth and channel offset, wherein the Bandwidth identification module comprises of at least one 40 MHz channel offset identification module and at least one 40 MHz channel offset validation module.

In an embodiment, the 40 MHz channel offset identification module comprises of a primary channel identification module for identifying the location of the primary channel by comparing a center frequency index and a primary channel frequency index. In case, the center frequency index is greater than the primary channel frequency index then the primary channel is located at lower band or else if the center frequency index is lesser than the primary channel frequency index then primary channel is located at upper band. The 40 MHz channel offset identification module also comprises of a Frequency Domain Cross correlation Computation module for computing a cross-correlation between a sequence of equalized frequency domain sub-symbols of a signal field in the lower frequency band and a sequence of equalized frequency domain sub-symbols of a signal field in the upper frequency band. The 40 MHz channel offset identification module also comprises of a Frequency Domain Energy Computation module for computing energy of the sequence of equalized frequency domain sub-symbols of the signal field in the lower frequency band, if, the primary channel is located at lower band. In case the primary channel is located at upper band, the Frequency Domain Energy Computation module computes Energy of the sequence of equalized frequency domain sub-symbols of the signal field in the upper frequency band. The 40 MHz channel offset identification module also comprises of a comparator module for comparing the cross-correlation between the sequence of equalized frequency domain sub-symbols of the signal field in the lower frequency band and the sequence of equalized frequency domain sub-symbols of the signal field in the upper frequency band with a product of the energy of the sequence of equalized frequency domain sub-symbols of a signal field in the lower frequency band and a predetermined threshold, if, the primary channel is located at lower band, wherein if the cross-correlation is greater than the product, then the offset is identified as CH_OFF_40 or CH_OFF_40_NON_HT_DUP, else the offset is identified as CH_OFF_20L. In case, the primary channel is located at upper band, the comparator module compares the cross-correlation between the sequence of equalized frequency domain sub-symbols of the signal field in the lower frequency band and the sequence of equalized frequency domain sub-symbols of the signal field in the upper frequency band with the product of the energy of the sequence of equalized frequency domain sub-symbols of the signal field in the upper frequency band with the predetermined threshold, wherein if the cross-correlation is greater than the product then the offset is identified as CH_OFF_40 or CH_OFF_40_NON_HT_DUP else the offset is identified as CH_OFF_20U. In an aspect, there may be provided a frame format detector for detecting the frame format and distinguishing between CH_OFF_40 and CH_OFF_40_NON_HT_DUP channel offsets. If the frame format is legacy frame format then channel offset is identified as CH_OFF_40_NON_HT_DUP otherwise CH_OFF_40 channel offset is identified. In an aspect, the 40 MHz channel offset validation module may validate the output of the 40 MHz channel offset identification module to determine the valid channel offset. Based on the valid channel offset the channel bandwidth may be determined.

In an embodiment, there is provided a method for receiving and identifying channel bandwidth and channel offset of an orthogonal frequency division multiplexing signal when the receiver is tuned to operate using RF bandwidths namely 20 MHz or 40 MHz. The method comprises the steps of receiving one or more signals. In an aspect, each of the one or more signals has an associated center frequency index, a primary channel frequency index and a PHY protocol data unit. In another aspect, the PHY protocol data unit also referred as PPDU comprises of a training field, a signal field and a data field. Upon receiving the signal, the location of primary channel of the received signal is identified by comparing the center frequency index and the primary channel frequency index of the signal. If the center frequency index is greater than the primary channel frequency index then primary channel is located at lower band or else if the center frequency index is lesser than the primary channel frequency index then primary channel is located at upper band. A sequence of equalized frequency domain sub-symbols of a signal field in the lower frequency band and a sequence of equalized frequency domain sub-symbols of a signal field in the upper frequency band is then determined. Thereupon, a cross-correlation is computed between the sequence of equalized frequency domain sub-symbols of the signal field in the lower frequency band and the sequence of equalized frequency domain sub-symbols of the signal field in the upper frequency band. In case, the primary channel is located at lower band then computing energy of the sequence of equalized frequency domain sub-symbols of a signal field in the lower frequency band; and comparing the cross-correlation between the sequence of equalized frequency domain sub-symbols of the signal field in the lower frequency band and the sequence of equalized frequency domain sub-symbols of the signal field in the upper frequency band with the product of the energy of the sequence of equalized frequency domain sub-symbols of a signal field in the lower frequency band and the predetermined threshold, if the cross- correlation is greater than the product, then the offset is identified as CH_OFF_40 or CH_OFF_40_NON_HT_DUP, else the offset is identified as CH_OFF_20L. In another case, if the primary channel is located at upper band then computing energy of the sequence of equalized frequency domain sub-symbols of a signal field in the upper frequency band; and comparing the cross-correlation between the sequence of equalized frequency domain sub-symbols of a signal field in the lower frequency band and the sequence of equalized frequency domain sub-symbols of a signal field in the upper frequency band with the product of the energy of the sequence of equalized frequency domain sub-symbols of a signal field in the upper frequency band and the predetermined threshold, if the cross correlation is greater than the product then the offset is identified as CH_OFF_40 or CH_OFF_40_NON_HT_DUP, else the offset is identified as CH_OFF_20U. In an aspect, there may be a step of detecting a frame format and distinguishing between CH_OFF_40 or CH_OFF_40_NON_HT_DUP channel offsets. If the frame format is detected as a Legacy frame format then CH_OFF_40_NON_HT_DUP channel offset is identified otherwise CH_OFF_40 channel offset is identified.

In another embodiment, a method for identifying a channel bandwidth and channel offset of a transmitted orthogonal frequency division multiplexing signal by a receiver having RF bandwidth tuned to 80 MHz is provided. The method comprising the steps of: receiving one or more orthogonal frequency division multiplexing signals, wherein each of the one or more orthogonal frequency division multiplexing signals have three associated frequency indexes, a primary channel frequency index and a PHY protocol data unit having a training field, a signal field and a data field. Identifying the location of primary channel by comparing the center frequency indexes with the primary channel frequency index. Determining one or more 40 MHz channel offset and one or more 80 MHz channel offset based on the location of the primary channel. Determining the channel offset by validating the 40 MHz channel offset and a 80 MHz channel offset. If the 40 MHz channel offset is valid then the channel offset of the signal is CH_OFF_40, CH_OFF_40_NON_HT_DUP, CH_OFF_20U, CH_OFF_20L or CH_OFF_20 else if the 80 MHz channel offset is valid then the channel offset of the signal is CH_OFF_80 or CH_OFF_80_NON_HT_DUP. In an aspect, if the channel offset is identified as CH_OFF_80 or CH_OFF_80_NON_HT_DUP and a Legacy frame format is detected then the channel offset is declared as CH_OFF_80_NON_HT_DUP else it is declared as CH_OFF_80.

In yet another embodiment, an apparatus for identifying a channel bandwidth and channel offset of an orthogonal frequency division multiplexing signal when RF bandwidth is tuned to 80 MHz, comprising a receiving unit, a first 40 MHz channel offset identification module, a second 40 MHz channel offset identification module, a first 40 MHz channel offset validation module, a second 40 MHz channel offset validation module, a 80 MHz channel offset identification module, a 80 MHz channel offset validation module, a decision box wherein the receiving unit is configured for receiving one or more OFDM signals, wherein each of the one or more OFDM signals have an associated center frequency index, a primary channel frequency index and a PHY protocol data unit, and wherein the PHY protocol data unit comprises of a training field, a signal field and a data field; the first 40 MHz channel offset identification module identifies a first 40 MHz channel offset mode; the first 40 MHz channel offset validation module validates the output of the first 40 MHz channel offset identification module; the second 40 MHz channel offset identification module identifies a second 40 MHz channel offset mode; the second 40 MHz channel offset validation module validates the output of the second 40 MHz channel offset identification module, wherein the second 40 MHz channel offset identification module and the second 40 MHz channel offset validation module are activated when the primary channel is located either in Band-3 or Band-4 of the received signal; the 80 MHz channel offset identification module identifies a 80 MHz channel offset mode; the 80 MHz channel offset validation module validates the output of the 80 MHz channel offset identification module; and the decision box receives the outputs from the first 40 MHz channel offset identification module, the second 40 MHz channel offset identification module, the first 40 MHz channel offset validation module, the second 40 MHz channel offset validation module, the 80 MHz channel offset identification module and the 80 MHz channel offset validation module and identifies the valid channel bandwidth and channel offset.

It is another object of the present invention to provide a method for channel bandwidth and channel offset identification that is performed after channel equalization.

It is yet another object of the present invention to provide a method for channel bandwidth and channel offset identification that and does not require extensive hardware components and is useful in real time channel environments.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the invention. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4A illustrates a block diagram of PHY protocol data unit (PPDU) format for a Legacy (Non-HT) frame.

FIG. 4B illustrates a block diagram of PHY protocol data unit (PPDU) for a HT mixed mode (HT-MM) frame format.

FIG. 4C illustrates a block diagram of PHY protocol data unit (PPDU) for a HT Greenfield (HT-GF) frame format.

FIG. 4D illustrates a block diagram of PHY protocol data unit (PPDU) for a VHT frame format.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present invention describes apparatuses and methods for identifying channel bandwidth and channel offset in a signal. The signal is received by a receiver apparatus. In an aspect, the receiver apparatus is an orthogonal frequency division multiplexing (OFDM) apparatus enabled to communicate according to any one or more of IEEE 802.11a, IEEE 802.11n and IEEE 802.11ac standards. The IEEE 802.11a, IEEE 802.11n and IEEE 802.11ac standards provide OFDM mechanism for sending and receiving multiplexed data signals over a single channel. Moreover, IEEE 802.11n and IEEE 802.11ac standards allow for channel bonding wherein multiple 20 MHz channels may be joined together to utilize available spectrum efficiently.

Figure 1:
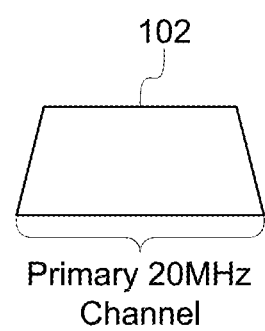
FIG. 1 illustrates a 20 MHz Channel bandwidth.

FIG. 1 illustrates a 20 MHz channel bandwidth option. The 20 MHz channel bandwidth option comprises of a single primary 20 MHz channel (102), therefore no channel bonding takes place in this option. Individual 20 MHz channels are bonded together to achieve 40 MHz and 80 MHz channel bandwidths.

Figure 2:
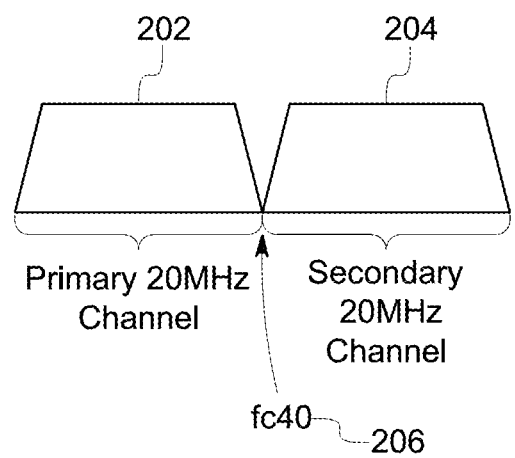
FIG. 2 illustrates channel bonding for a 40 MHz Channel bandwidth.

FIG. 2 illustrates channel bonding for a 40 MHz channel bandwidth option. IEEE 802.11n and now IEEE 802.11ac provide a channel bonding technique for enhancing the data transmission of a signal. In channel bonding, two or more 20 MHz channels are bonded together to form a single 40 MHz or 80 MHz channel. One of the 20 MHz channels is called a primary channel and rest of the 20 MHz channels are called secondary channels. FIG. 2 illustrates a primary 20 MHz channel (202) and a secondary 20 MHz channel (204) being bonded together to achieve a 40 MHz channel bandwidth. FIG. 2 also illustrates a center frequency fc40 of the 40 MHz channel which is the joint between the primary 20 MHz channel and the secondary 20 MHz channel. Channel offset for 40 MHz channel bandwidth option is formed by bonding primary 20 MHz channel and secondary 20 MHz channel.

Figure 3:
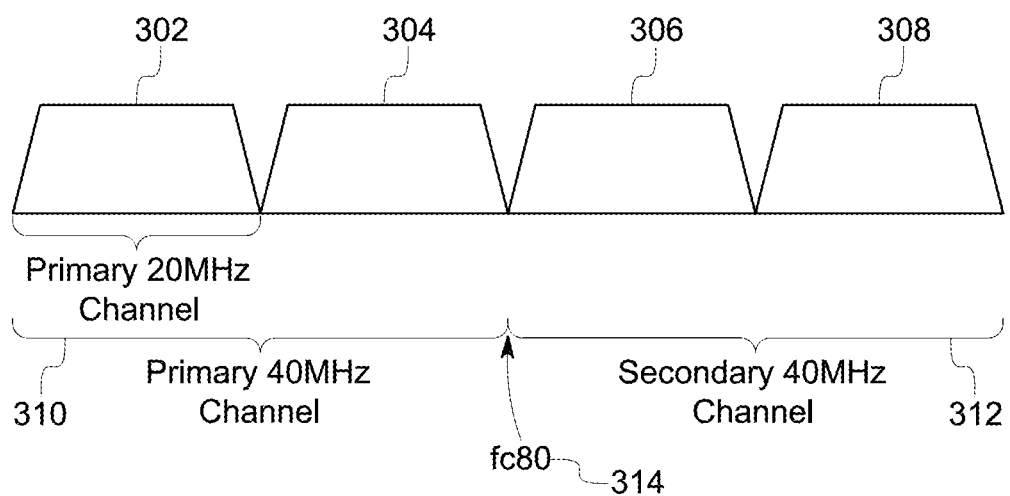
FIG. 3 illustrates channel bonding for 80 MHz Channel bandwidth.

FIG. 3 illustrates channel bonding for 80 MHz Channel bandwidth where fc80 (314) represents the 80 MHz channel center frequency. The 80 MHz channel is formed by a primary 40 MHz channel (310) and a secondary 40 MHz channel (312). Each of the primary 40 MHz channel and secondary 40 MHz channel are in turn formed by two 20 MHz channels. Channel offset for 80 MHz channel bandwidth option is formed by bonding primary 40 MHz channel and secondary 40 MHz channel. The first 20 MHz channel (302), second 20 MHz channel (304), third 20 MHz channel (306), and fourth 20 MHz channel (308) together form an 80 MHz channel bandwidth. In primary 40 MHz channel of 80 MHz channel bandwidth, any one of the two 20 MHz channels forming the primary 40 MHz channel may be a primary 20 MHz channel, and rest three 20 MHz channels are considered secondary channels. The primary 40 MHz channel (310) is formed of the first 20 MHz channel (302) and second 20 MHz channel (304). Anyone one of the first 20 MHz channel (302) or second 20 MHz channel (304) may be a primary channel. FIG. 3 depicts the first 20 MHz channel (302) as the primary channel according to an exemplary embodiment. The secondary 40 MHz channel (312) is formed of the third 20 MHz channel (306) and fourth 20 MHz channel (308).

According to IEEE 802.11 standards, each signal carries a data unit between the physical layer of the transmitter apparatus to the physical layer of the receiver apparatus. Such a data unit is known as a physical layer (PHY) protocol data unit or a PPDU. PPDU is a unit of data exchanged between two peer physical layer entities to provide the physical layer data service.

One of the key requirements of IEEE 802.11ac is backward compatibility with previous WLAN standards based on OFDM modulation and therefore IEEE 802.11ac supports various PPDU that are utilized by various prior available standards. Each PPDU at least consists of a training field, a signal field and a data field. FIG. 4(A) represents an exemplary PPDU for Legacy (IEEE 802.11-1997) or Non-high throughput (Non-HT) frame format, wherein L-STF is Legacy-Short Training Field, L-LTF is Legacy-Long Training Field, L-SIG is Legacy-signal field, and L-DATA is Legacy Data field.

FIG. 4(B) represents an exemplary PPDU for High throughput mixed mode (HT-MM) frame format, wherein L-STF is Legacy-Short Training Field, L-LTF is Legacy-Long Training Field, L-SIG is Legacy-signal field, HT-SIG is High throughput-signal field, HT-STF is High throughput-Short Training Field, HT-LTF is High throughput-Long Training Field, and HT-DATA is High throughput Data field.

FIG. 4(C) represents an exemplary PPDU for High throughput Greenfield (HT-GF) frame format, wherein HT-STF is High throughput-Short Training Field, HT-LTF is High throughput-Long Training Field, HT-SIG is High throughput-signal field, and HT-DATA is High throughput Data field.

FIG. 4(D) represents an exemplary PPDU for Very High throughput (VHT) frame format, wherein L-STF is Legacy-Short Training Field, L-LTF is Legacy-Long Training Field, L-SIG is Legacy-signal field, VHT-SIG-A is Very High throughput-Signal-A, VHT-STF is Very High throughput-Short Training Field, VHT-LTF is Very High throughput-Long Training Field, VHT-SIG-B is Very High throughput-Signal-B, and VHT-DATA is Very High throughput-Data.

IEEE 802.11n and IEEE 802.11ac recommend different combinations of channel offset for efficiently transmitting physical layer protocol data unit independently in primary channel or by combination of primary and secondary channel by channel bonding technique, depending on the availability of the spectrum. A 20 MHz channel bandwidth of IEEE 802.11a, IEEE 802.11n and IEEE 802.11ac has only a single primary 20 MHz channel and hence has only one channel offset namely CH_OFF_20. Hence, for channel offset CH_OFF_20 the channel bandwidth is 20 MHz and such 20 MHz channel is the only available channel for transmission.

Figure 5A:
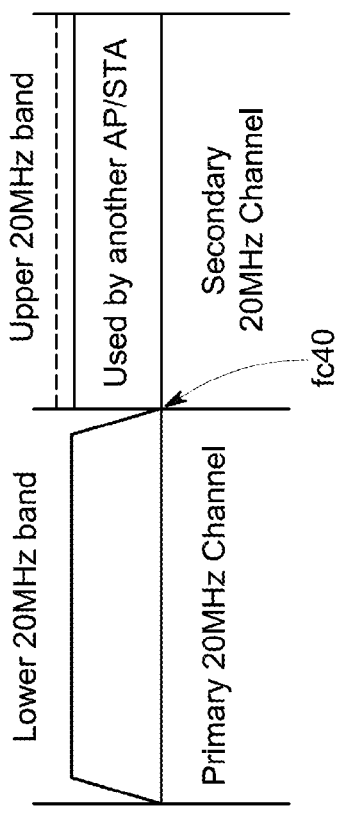
FIGS. 5A, 5B and 5C illustrate various classifications of channel offset for 40 MHz channel bandwidth.
Figure 5B:
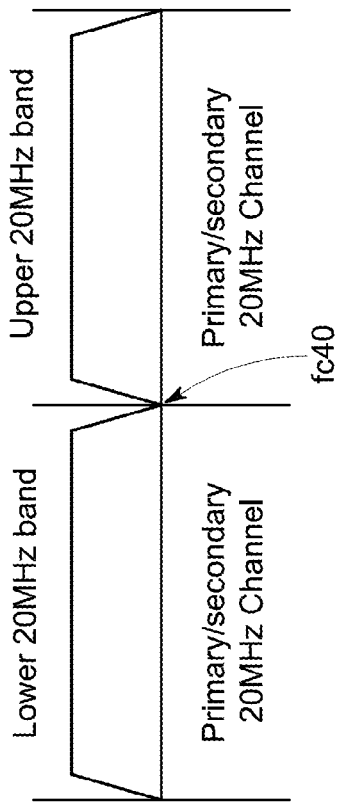
Figure 5C:
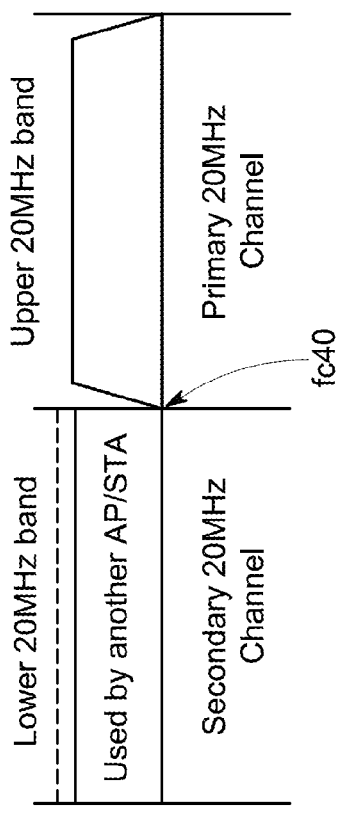

A 40 MHz channel bandwidth of IEEE 802.11 n and IEEE 802.11 ac as illustrated in FIG. 2 is formed of a primary 20 MHz channel and a secondary 20 MHz channel. FIGS. 5(A), 5(B) and 5(C) illustrate various classifications of channel offset for 40 MHz channel bandwidth. The 40 MHz channel bandwidth may have five possible modes of channel offset namely CH_OFF_20, CH_OFF_20U, CH_OFF_20L, CH_OFF_40 and CH_OFF_40_NON_HT_DUP. FIG. 5(A) illustrates an exemplary CH_OFF_40 and CH_OFF_40_NON_HT_DUP channel offset. Both CH_OFF_40 and CH_OFF_40_NON_HT_DUP have the primary as well as the secondary channel available for transmission, however, the difference lies in that the CH_OFF_40_NON_HT_DUP utilizes the secondary channel for transmitting a duplicate copy of the signal transmitted by the primary channel. The CH_OFF_40_NON_HT_DUP mode is used by Non-HT stations using Legacy or Non-HT frame format and is also known as "40 MHz Non-HT duplicate mode". In CH_OFF_40_NON_HT_DUP channel offset mode the primary 20 MHz channel may be located either in the upper side or in the lower side. Since, both the primary 20 MHz channel and the secondary 20 MHz channels are used for transmission, therefore the utilized channel bandwidth in CH_OFF_40 and CH_OFF_40_NON_HT_DUP channel offset mode is 40 MHz.

The CH_OFF_40 utilizes both the primary 20 MHz channel and the secondary 20 MHz channel for 40 MHz transmission. In this mode the primary 20 MHz channel may be located either in upper side or in lower side of 40 MHz channel bandwidth. The CH_OFF_40 mode is also known as "Full 40 MHz mode" as shown in FIG. 5(A). The CH_OFF_40 channel offset mode is used by High Throughput Mixed Mode (HT-MM), High Throughput-Green Field (HT-GF) and Very High Throughput (VHT) frame format.

FIG. 5(B) illustrates the CH_OFF_20L channel offset mode. The CH_OFF_20L channel offset mode utilizes the lower 20 MHz channel in the 40 MHz channel bandwidth option for signal transmission. In this mode the primary 20 MHz channel is located in the lower side of the 40 MHz channel bandwidth. In the CH_OFF_20L channel offset mode, the secondary 20 MHz channel is located in the upper side of the 40 MHz channel bandwidth. There is either no transmission in the secondary 20 MHz channel or the secondary channel is used by another Access Point or station therefore the used channel bandwidth is only 20 MHz. This mode is also called as "20 MHz Lower mode".

FIG. 5(C) illustrates the CH_OFF_20U channel offset mode. The CH_OFF_20U channel offset utilizes the upper 20 MHz channel in the 40 MHz channel bandwidth option for signal transmission. There is either no transmission in the secondary 20 MHz channel or the secondary channel is used by another Access Point or station. In this mode, the primary 20 MHz channel is located in the upper side and the secondary 20 MHz channel is located in the lower side of the 40 MHz channel bandwidth. Since, only the primary 20 MHz channel is used for transmission, therefore the used channel bandwidth is only 20 MHz. The CH_OFF_20U channel offset is also called "20 MHz upper mode".

IEEE 802.11ac in addition provides channel bonding for 80 MHz channel bandwidth and seven channel offset modes for 80 MHz channel bandwidth option. The channel offset modes for 80 MHz channel bandwidth include the channel offsets for 20 MHz and 40 MHz channel bandwidths and two additional channel offsets commonly known as CH_OFF_80 and CH_OFF_80_NON_HT_DUP. The CH_OFF_80 channel offset mode indicates that both primary 40 MHz channel and secondary 40 MHz channel are used for transmission. This mode is also called as Full 80 MHz mode. The CH_OFF_80 channel offset mode is used only by Very High Throughput (VHT) frame format.

The CH_OFF_80_NON_HT_DUP channel offset mode provided for 80 MHz channel bandwidth indicates that only the primary 20 MHz channel is used for transmission and other three secondary 20 MHz channels consist of duplicated information of primary 20 MHz channel. This mode is also known as "80 MHz Non-HT duplicate mode". The CH_OFF_80_NON_HT_DUP channel offset mode is used by Non-High throughput stations or by Legacy frame format.

In case the channel bandwidth is more than 20 MHz i.e. 40 MHz or 80 MHz channels, the transmitter utilizes a Dynamic Frequency Selection (DFS) algorithm that first searches for availability of a primary channel and then a secondary channel is searched for channel bonding, so that the whole spectrum is effectively utilized. After deciding the availability of primary and secondary channel, a PHY protocol data unit frame also known as PPDU is transmitted using 20 MHz, 40 MHz or 80 MHz channel bandwidth in respective primary and/or secondary channels. At the receiver end there is a need for identifying the channel bandwidth using which the PPDU has been transmitted and the related channel offset.

In the present embodiment, we consider that a PPDU comprises of various component symbols specifically a Long Training Field (LTF) referred to as LTF-A and a signal field referred to as SIG-T. In an aspect, the LTF-A symbol may be L-LTF (Legacy-Long Training field) in case of Legacy (Non-HT), HT mixed mode (HT-MM), and VHT frame format or HT-LTF (High Throughput-Long Training field) in case of HT Greenfield (HT-GF) frame format as described in FIGS. 4A, 4B, 4C and 4D respectively. The LTF-A symbol is used for channel estimation. In an aspect, the SIG-T symbol may be L-SIG in case of Legacy (Non-HT), HT mixed mode (HT-MM), and VHT frame format or first symbol of HT-SIG in case of HT Greenfield (HT-GF) frame format. The channel bandwidth and channel offset identification is performed using the SIG-T symbol.

Figure 6:
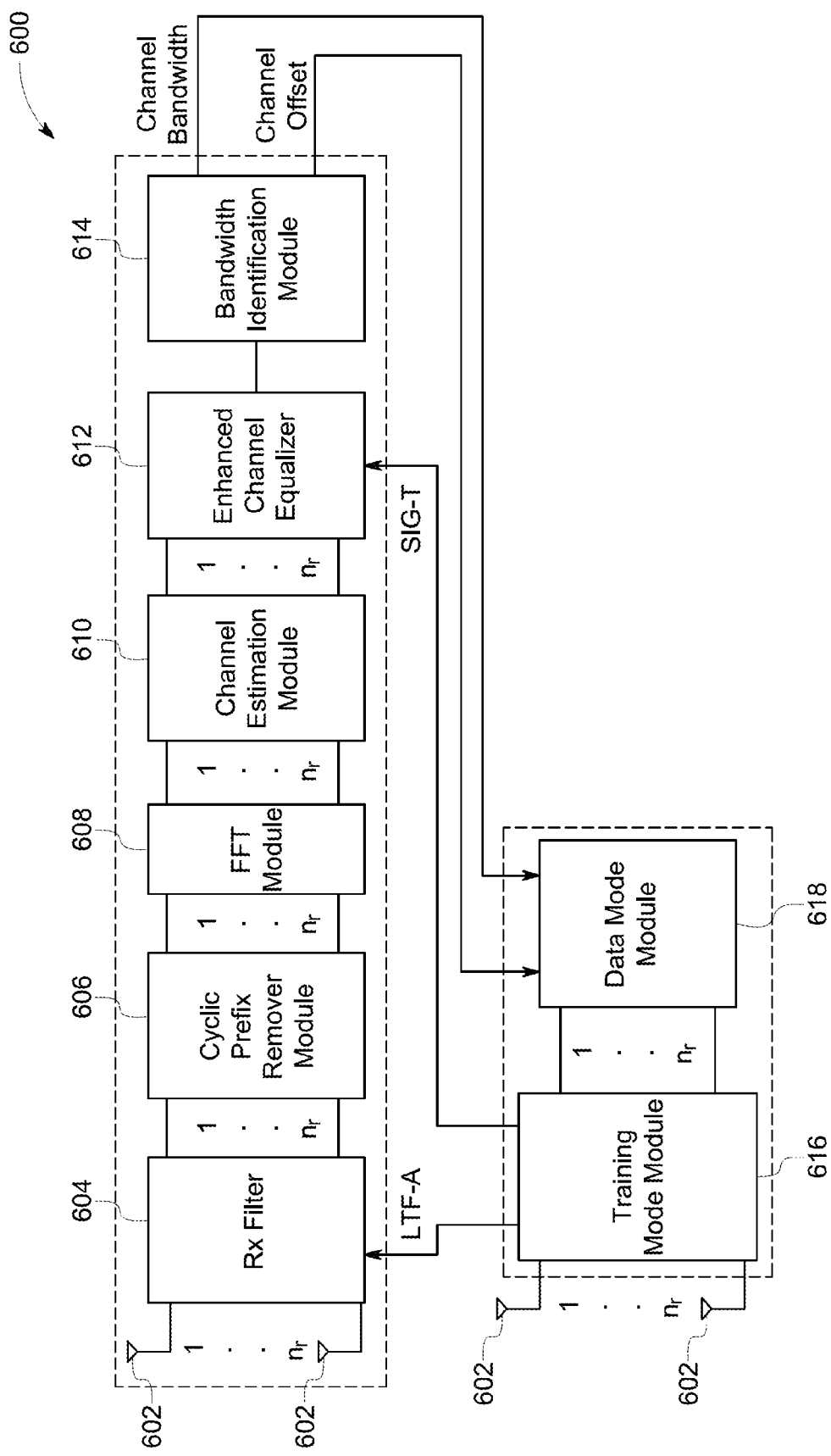
FIG. 6 illustrates a system diagram of receiver apparatus, according to one of the embodiments of the present application.

FIG. 6 illustrates a diagram of a receiver apparatus, according to one of the embodiments. In an aspect, the receiver apparatus may be tuned to a plurality of RF bandwidths including 20 MHz, 40 MHz and 80 MHz. The physical layer of the receiver apparatus (600) is the first layer to come in contact with the received signal and should have information regarding the channel bandwidth and channel offset of the received signal. The receiver apparatus may be an orthogonal frequency division multiplexing (OFDM) complaint wireless receiver apparatus. In an aspect, the receiver apparatus may be complaint with one or more of the IEEE 802.11a, IEEE 802.11n and IEEE 802.11ac standards. The receiver apparatus (600) comprises of one or more antennas (602), a Receiver Filter referred to as Rx Filter (604), a cyclic prefix remover module (606), an Fast Fourier transform (FFT) module (608), a channel estimation module (610), an Enhanced channel equalizer (612), a Bandwidth identification module (614), a Training mode module (616), and a data mode module (618).

According to an exemplary embedment, a multiple input-multiple output (MIMO) OFDM system based on IEEE 802.11ac is considered. The system comprises of $n_t$ number of transmitting antennas at the transmitting apparatus and $n_r$ number of receiving antennas at the receiving apparatus, where $i^{th}$ transmitting antenna is represented by (TN) and $j^{th}$ receiving antenna is represented by ($RX_j$). The Media Access Control (MAC) layer of the transmitting apparatus selects the available channel bandwidth with respect to a center frequency index ($f_c$) and its associated 20 MHz primary channel frequency index ($f_p$) by using Dynamic Frequency Selection (DFS) algorithm.

In an embodiment, the receiver apparatus (600) may have $n_r$ number of receiving antennas (602). In an aspect, the orthogonal frequency division multiplexing receiver apparatus may have $n_r=1$ receiving antennas thereby making the receiver apparatus a single-input and single-output apparatus. In another aspect, the orthogonal frequency division multiplexing receiver apparatus may have $n_r>1$ receiving antennas thereby making the receiver apparatus a multiple-input and multiple-output apparatus. The receiver antennas (602) are configured for receiving a chain of signals from the one or more transmitting antennas. The receiver apparatus may have prior knowledge of a center frequency index ($f_c$) and a 20 MHz primary channel frequency index ($f_p$). The center frequency index ($f_c$) is the set of integer channel numbers that correspond to frequency segments that are legal for the operating class. The center frequency index ($f_c$) and the 20 MHz primary channel frequency index ($f_p$) may be utilized for determining the location of the primary 20 MHz channel in the received signal, however, the receiver apparatus may not have prior information regarding the Channel bandwidth and the channel offset of the transmitted OFDM signal. It is necessary for a receiving apparatus to have knowledge about the channel bandwidth along with the channel offset for correct demodulation of the received signal.

The Rx filter unit (604) as well as the Training mode module (616) receive the signal by means of the one or more antennas (602). In an embodiment, the Training mode module (616) may comprise of an Energy Detection module, an Automatic gain control module and a coarse and fine time and frequency synchronization module. On receiving a signal chain by means of $n_r$ receiving antennas (602), the Training mode module (616) processes the primary 20 MHz channel irrespective of the RF bandwidth. Firstly, the Energy Detection module detects the energy of the signal on each of the received signal chain. Then, the Automatic gain control module settles the gain on each of the received signal chain. The coarse and fine time and frequency synchronization module is used for detecting LTF-A and SIG-T in the received PPDU frame.

Once, LTF-A has been detected by the Training mode module (616), the Rx filter unit (604) performs a low pass filtering operation on each of the received signal chain depending on the $n_r$ antennas. In an aspect, the Rx filter unit (604) is tuned to extract signals of RF bandwidth of 20 MHz or 40 MHz or 80 MHz. After receiver filtering the cyclic prefix (CP) portion of the signal is removed by cyclic prefix remover module (606). The FFT module (608) performs a Fast Fourier transform (FFT) on the filtered signal on each of the received signal chain. In an aspect, the FFT module (608) uses FFT size of 64, 128 or 256 depending on the RF bandwidth of 20 MHz, 40 MHz or 80 MHz respectively.

The Channel estimation module (610) estimates the Single Input Signal Output (SISO) or Multiple Input Multiple Output (MIMO) channel in frequency domain depending upon $n_r$ receiving antennas. If $n_r=1$, then Single Input Signal Output channel is estimated and if $n_r>1$ Multiple Input Multiple Output channel is estimated. In an aspect, the Single Input Signal Output (SISO) or Multiple Input Multiple Output (MIMO) channel is estimated on 64, 128 or 256 sub carriers depending on the RF bandwidth of 20 MHz, 40 MHz or 80 MHz respectively. The channel estimation operates on LTF-A or Long Training Field of the PPDU.

In an embodiment, for a single input signal output system i.e. $n_r=1$, the Training mode module (616) detects the energy of the signal, settles the automatic gain control, performs coarse and fine and time and frequency synchronization, and removes the cyclic prefix. The FFT module (608) estimates the frequency response of the channel, then the resultant demodulated OFDM symbol R(k) after Fast Fourier transform may be represented by the equation $$R(k)=H(k)X(k)+Z(k) \quad (1)$$

wherein H(k) stands for channel frequency response, X(k) stands for transmitted frequency domain sub-symbol, Z(k) stands for zero mean additive white Gaussian noise corresponding to the subcarrier index k. The range of subcarrier index may be expressed as k=N/2 to N/2−1, where N is the fast Fourier Transform size, In an aspect, fast Fourier Transform size N=64, 128 and 256 are utilized for 20 MHz, 40 MHz and 80 MHz channel bandwidth options respectively.

In another embodiment, for a multiple input multiple (MIMO) system i.e. $n_r>1$, the Training mode module (616) detects the energy of the signal, settles the automatic gain control, performs coarse and fine and time and frequency synchronization, and removes the cyclic prefix. Then, the FFT module (608) estimates the MIMO channel frequency response, then the demodulated OFDM symbol at the output of the FFT module for $m^{th}$ receiver, may be written as, $$R_m(k)=H_m(k)X(k)+Z_m(k) \quad (2)$$

where m=0,1,2 . . . $n_r$−1, $Z_m$(k) is additive white Gaussian noise in Frequency domain on the $m^{th}$ receiving antenna and $n_r$ is number of receiver chain antennas.

The Training mode module (616) also detects the SIG-T of received PPDU. Such detected SIG-T sub symbol is then equalized using Single Input Signal Output (SISO) or Multiple Input Multiple Output (MIMO) channel by the Enhanced channel equalizer (612). In case nr =1} the Enhanced channel equalizer module (612) uses Frequency domain Equalization (FDE) and if $n_r$ >1} Enhanced channel equalizer module(612) uses Maximum ratio combining (MRC). In an aspect, channel equalization may be performed on 64 or 128 or 256 sub carries depending on the RF bandwidth of 20 MHz, 40 MHz or 80 MHz respectively.

In an embodiment, the resultant demodulated symbol R(k) goes through the Enhanced channel equalizer (612). For SISO system frequency domain equalization is performed on R(k)) using the channel frequency response H(k). Then, equalized sub-symbol Y(k) can be expressed as $$Y(k) = X(k) + \frac{Z(k)}{H(k)} \quad (3)$$

The equalized sub-symbols Y(k) are then used in the Bandwidth identification module. For MIMO system maximum ratio combining (MRC) is performed on $R_m(k)$ using the channel frequency response $H_m(k)$.

During transmission, different cyclic shifts delay is applied in time domain to each of the transmitting chain to avoid unintentional beam forming. Then, combined channel frequency response $H_m(k)$ in the vector form can be written as, $$H_m(k) = \sum_{i=0}^{n_T-1} H_{mi}(k) e^{j\varphi_{k,i}} \quad (4)$$

where, $H_{mi}(k)$ is the channel frequency response from $i^{th}$ transmitter to $m^{th}$ receiving antenna and $\varphi_{k,i}$ is the phase due to cyclic shift delay introduced on $i^{th}$ transmitter chain. The maximum ratio combining sub-symbol $R_c(k)$ is given by, $$R_c(k) = \sum_{m=0}^{n_T-1} R_m(k) H_m^*(k) \quad (5)$$

Substituting (2) in (5), we get, $$R_c(k) = \sum_{m=0}^{n_T-1} |H_m(k)|^2 X(k) + \sum_{m=0}^{n_T-1} H_m^*(k) X(k) \quad (6)$$

Representing $H_c(k) = \sum_{m=0}^{n_T-1} |H_m(k)|^2$ and $Z_c(k) = \sum_{m=0}^{n_T-1} H_m^*(k) Z_m(k)$ (6) can be written as $$R_c(k) = H_c(k) X(k) + Z_c(k) \quad (7)$$

Finally, normalize $R_c(k)$ with $H_c(k)$ before sending equalized sub-symbols to channel offset identification module.

$$Y(k) = X(k) + \frac{Z_c(k)}{H_c(k)} \quad (8)$$

It is apparent that the combined signal for MIMO case given in (8) is in the same form (3), given for the SISO system. In this case also, the channel offset identification is performed on Y(k).

The equalized sub-symbols Y(k) received from the Enhanced channel equalizer (612) is fed to the Bandwidth identification module (614) along with the center frequency index ($f_c$) and the primary channel frequency index ($f_p$). The Bandwidth identification module (614) identifies the channel bandwidth and channel offset of the received OFDM signal. The Bandwidth identification module (614) may be automatically activated or deactivated based on the RF bandwidth to which the receiver apparatus is tuned. In an aspect, when the receiver apparatus (600) is tuned to RF bandwidth of 20 MHz, then Bandwidth identification module (614) may be automatically deactivated as there is only one possibility of channel bandwidth i.e. 20 MHz channel bandwidth and one possibility of channel offset i.e. CH_OFF_20.

In another aspect, when the receiver apparatus (600) is tuned to RF bandwidth of 40 MHz, then Bandwidth identification module (614) may be automatically activated and may identify one out of the five possible channel offsets i.e. the Bandwidth identification module (614) be able to identify CH_OFF_20, CH_OFF_40, CH_OFF_20U, CH_OFF_20L, or CH_OFF_40_NON_HT_DUP channel offset modes. Identification of CH_OFF_20U or CH_OFF_20L channel offset is similar to identifying CH_OFF_20. The identified channel offset is then in turn used to identify the channel bandwidth, for example if the channel offset is identified as CH_OFF_20 or CH_OFF_20U or CH_OFF_20L then the channel bandwidth is 20 MHz. In another example, if the identified channel offset mode is CH_OFF_40or CH_OFF_40_NON_HT_DUP then the channel bandwidth is declared as 40 MHz. The configuration of an exemplary bandwidth identification module when the receiver apparatus is tuned to 40 MHz is described in FIG. 7.

In yet another aspect, when the receiver apparatus (600) is tuned to RF bandwidth of 80 MHz, then Bandwidth identification module (614) may be automatically activated and may identify one out of the 7 possible channel offsets i.e. CH_OFF_20, CH_OFF_40, CH_OFF_20U, CH_OFF_20L, CH_OFF_40_NON_HT_DUP, CH_OFF_80 or CH_OFF_80_NON_HT_DUP channel offset modes. Moreover, when the receiver apparatus (600) is tuned to RF bandwidth of 80 MHz, then the Bandwidth identification module (614) may identify the channel bandwidth as either 20 MHz, or 40 MHz, or 80 MHz based on the identified channel offset.

Finally, the Data mode module (618) receives the information regarding the identified channel bandwidth and the channel offset from the Bandwidth identification module (614) for demodulating the received signal. The Data mode module (618) may comprise of a sub carriers selector, a De-mapper, a De-Interleaver, a stream De-parser, a de-puncturing and a Viterbi decoder module for demodulating the received signal in view of the channel bandwidth and the present channel offset.

Figure 7:
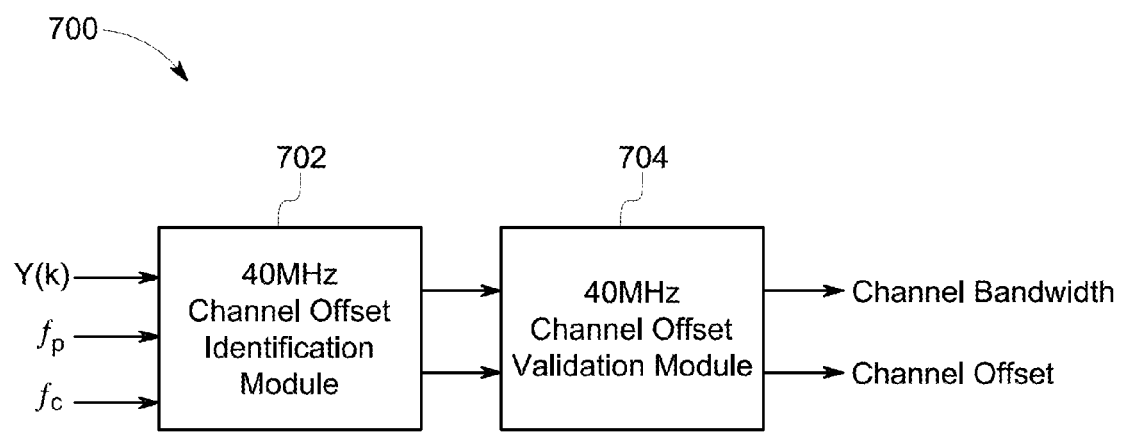
FIG. 7 illustrates a Bandwidth identification Module of receiver apparatus tuned to RF bandwidth of 40 MHz, according to one of the embodiments of the present application.

FIG. 7 illustrates a Bandwidth identification Module (700) of a receiver apparatus when tuned to RF bandwidth of 40 MHz, according to one of the embodiments. The Bandwidth identification Module determines the channel bandwidth used and the related channel offset. The Bandwidth identification Module (702) receives a sequence of sub symbols Y(k) of the signal from the enhanced channel equalizer, a center frequency index ($f_c$) and a primary channel frequency index ($f_p$). The Bandwidth identification Module (700) may be automatically activated or deactivated based on the RF bandwidth to which the receiver apparatus is tuned. The Bandwidth identification Module (700) comprises of a 40 MHz channel offset identification module (702) and a 40 MHz channel offset validation module (704). In an aspect, the 40 MHz channel offset identification module (702) may receive the sequence of sub symbols Y(k) of the signal from the enhanced channel equalizer, a center frequency index ($f_c$) and a primary channel frequency index ($f_p$) and identify the channel offset denoted by value or string of bits. The 40 MHz channel offset validation module (704) may receive the channel offset in terms of value or the string of bits calculated by the 40 MHz channel offset identification module (702) and compare the output with a predetermined string of bits or values that are mapped to the various possible channel offsets to ascertain the channel offset in the received signal. The internal configuration of a 40 MHz channel offset identification module for a receiver apparatus tuned to 40 MHz is described in FIG. 8. The internal configuration of a Bandwidth identification Module for a receiver apparatus tuned to 80 MHz is described in FIG. 11, FIG. 12 and FIG. 13.

Figure 8:
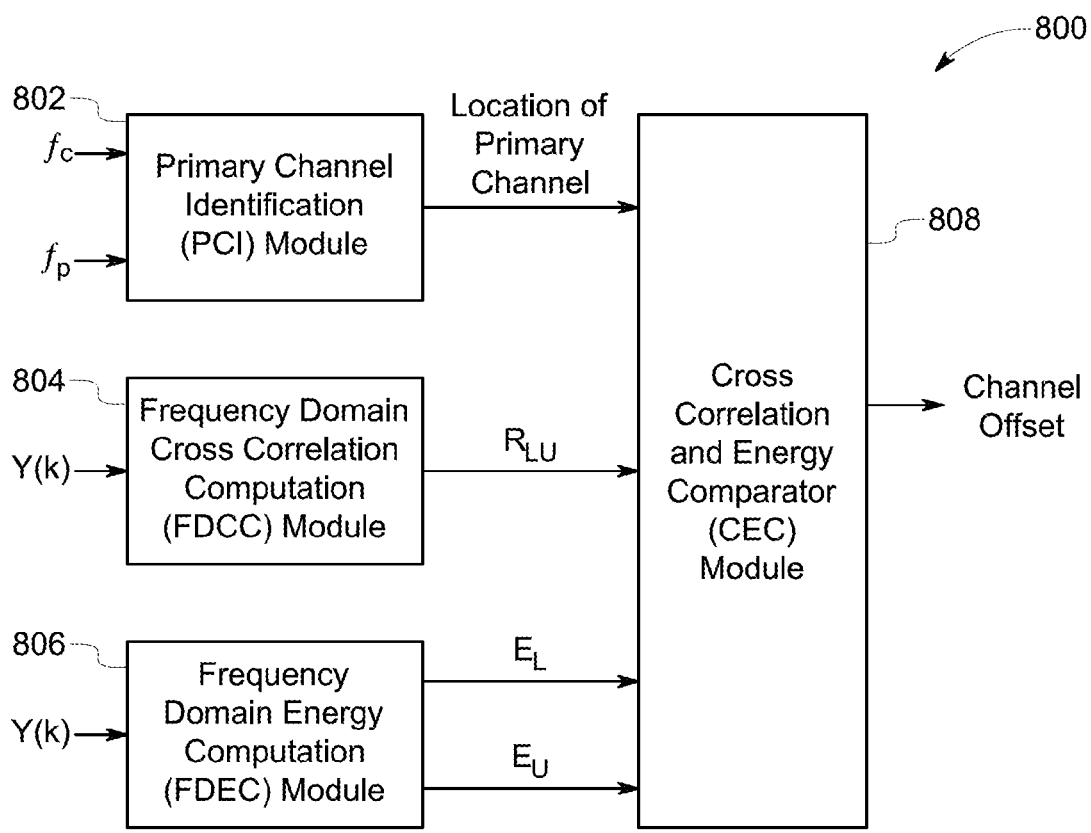
FIG. 8 illustrates a block diagram of a 40 MHz channel offset identification module, according to one of the embodiments of the present application.

After frequency domain equalization or maximum ratio combining operation, the channel offset identification is performed on equalized frequency domain sub-symbol Y(k) to identify any one of the possible modes of channel offset. FIG. 8 illustrates the configuration of a 40 MHz channel offset identification module (800) for a receiver apparatus tuned to 20 MHz or 40 MHz. The 40 MHz channel offset identification module (800) comprises of four modules namely a Primary Channel identification module (802), a Frequency Domain Cross correlation Computation module (804), a Frequency Domain Energy Computation module (806), and a Cross correlation and Energy comparator module (808).

The Primary Channel identification module (802) identifies the location of primary 20 MHz channel based on two input parameter i.e. center frequency index ($f_c$) and primary channel frequency index ($f_p$), which are known at the receiver. If the center frequency index is greater than the primary channel frequency index ($f_c > f_p$) then the primary 20 MHz channel is located at "lower band" or else if center frequency index is lesser than the primary channel frequency index ($f_c < f_p$), then primary 20 MHz channel is located at "upper band". If the primary 20 MHz channel is located in "upper band" of channel, there might be ambiguity whether the received channel offset is anyone of CH_OFF_40_NON_HT_DUP and CH_OFF_40 or CH_OFF_20U. In another case, if the primary 20 MHz channel is located in "lower band" there might be ambiguity whether the received channel offset is anyone of CH_OFF_40_NON_HT_DUP and CH_OFF_40 or CH_OFF_20L. Such an ambiguity is further resolved by Frequency Domain Cross correlation Computation module (804), Frequency Domain Energy Computation module (806), and Cross correlation and Energy comparator module (808). Further, there may be provided a frame format detector for distinguishing between CH_OFF_40_NON_HT_DUP and CH_OFF_40.

The Frequency Domain Cross correlation Computation module (804) calculates the cross correlation $R_{LU}$ between the sequence of equalized frequency domain sub-symbols of SIG-T in the lower frequency band and the sequence of equalized frequency domain sub-symbols of SIG-T in the Upper-frequency band. The cross correlation is calculated according to the equation $$R_{LU} = \sum_{k_1 \in k_l, k_2 \in k_u} Y(k_1) Y^*(k_2) \qquad (9)$$

Wherein $k_l$ is the used subcarrier index of lower frequency band in the range $$\left[-\frac{N}{2} : -1\right],$$

and $k_u$ is the used subcarrier index of upper frequency band in the range [1:N/2], where N is the Fast Fourier Transform size and N=128 for 40 MHz RF bandwidth option.

The Frequency Domain Energy Computation module (806) calculates the energy of the sequence of equalized frequency domain sub-symbols of SIG-T in the lower frequency band ($E_L$) and the energy of the sequence of equalized frequency domain sub-symbols of SIG-T in the upper frequency band ($E_U$). $E_L$ and $E_U$ can be expressed as, $$E_L = \sum_{\forall k_1 \in k_l} |Y(k_1)|^2 \qquad (10)$$

$$E_U = \sum_{\forall k_2 \in k_u} |Y(k_2)|^2 \qquad (11)$$

The Cross correlation and Energy comparator module (808) compares the cross correlation with the energies calculated above for identifying the exact mode of channel offset. In case the Primary Channel identification module (802) identified the primary 20 MHz channel being located in the "upper band" of channel, then the cross correlation $R_{LU}$ between lower band and upper band is compared with the energy of the sequence of equalized frequency domain sub-symbols of SIG-T in the upper frequency band $E_U$ multiplied by a predetermined threshold T. If the cross correlation $R_{LU}$ between the two bands is greater than the energy $E_U$ multiplied by threshold T then the channel offset is identified in frequency domain as either one of the CH_OFF_40_NON_HT_DUP and CH_OFF_40 or else it is declared as CH_OFF_20U.

In another case, if the Primary Channel identification module (802) identified the primary 20 MHz channel being located in the "lower band" of channel, then the cross correlation $R_{LU}$ between lower band and upper band is compared with the energy of the sequence of equalized frequency domain sub-symbols of SIG-T in the lower frequency band $E_L$ multiplied by the predetermined threshold T. If the cross correlation $R_{LU}$ between the two bands is greater than the energy $E_L$ multiplied by threshold T then the channel offset is identified in frequency domain as either one of the CH_OFF_40_NON_HT_DUP and CH_OFF_40 or else it is declared as CH_OFF_20L.

Figure 9:
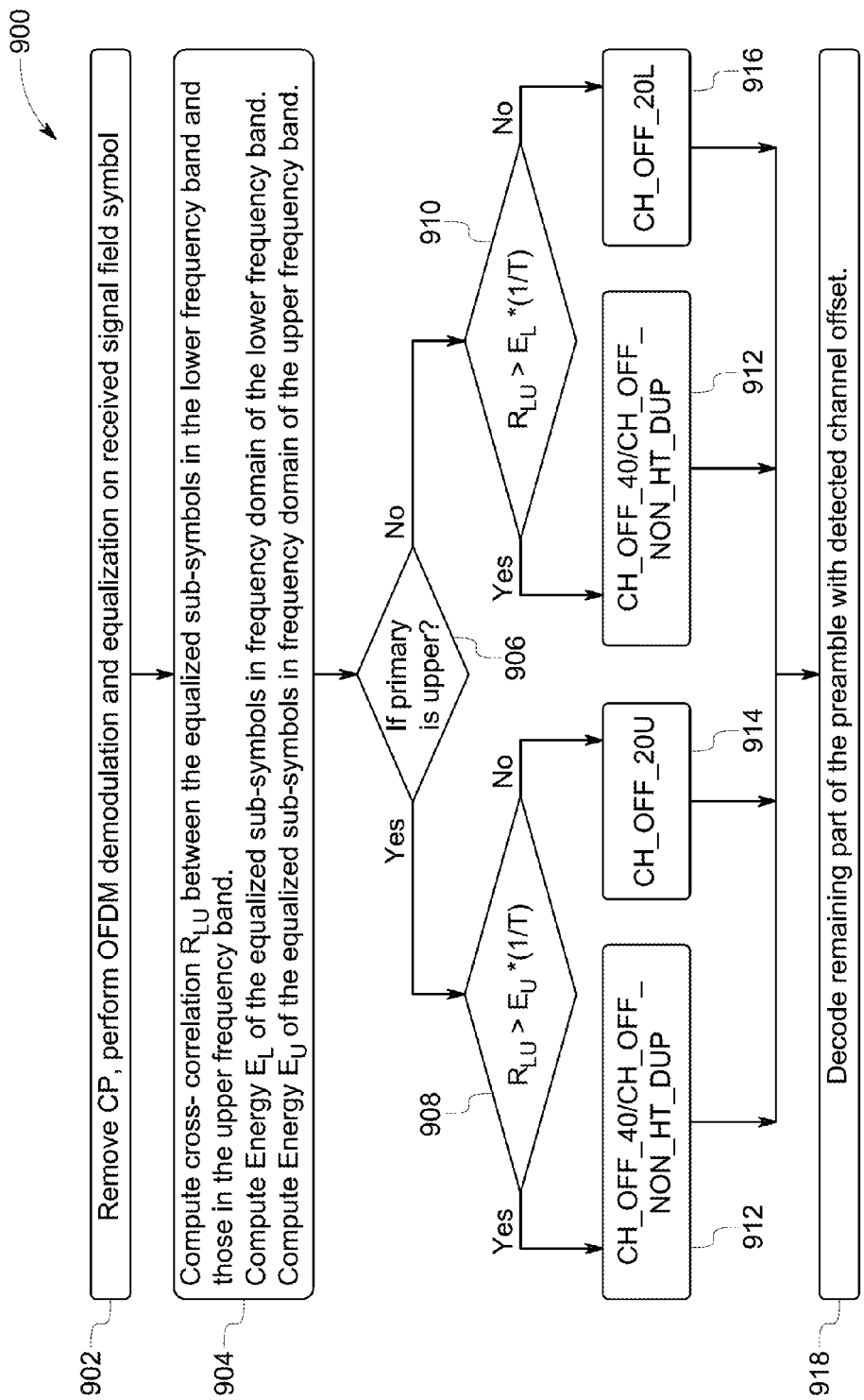
FIG. 9 illustrates a flowchart describing the method for channel offset identification for 40 MHz channel bandwidth.

In an aspect, the method may include steps for distinguishing between CH_OFF_40 and CH_OFF_40_NON_HT_DUP. In an aspect a frame format detector may be provided for detecting a Legacy frame format. In case the frame format detector detects the presence of a Legacy frame format then the channel offset is declared as CH_OFF_40_NON_HT_DUP else it is declared as CH_OFF_40 mode FIG. 9 illustrates a flow describing the method (900) for channel offset identification in a 40 MHz channel bandwidth. Initially one or more OFDM signals are received, wherein each of the one or more OFDM signals have an associated center frequency index, a primary channel frequency index and a PHY protocol data unit, and wherein the PHY protocol data unit comprises of a training field, a signal field and a data field.

At step (902) the location of primary Channel is identified by comparing a center frequency index and a primary channel frequency index, if the center frequency index is greater than the primary channel frequency index then primary channel is located at lower band or else if the center frequency index is lesser than the primary channel frequency index then primary channel is located at upper band. Thereupon, the sequence of equalized frequency domain sub-symbols of SIG-T in the lower frequency band is identified and the sequence of equalized frequency domain sub-symbol of SIG-T in the upper frequency band is identified.

At step (904) a cross-correlation between the sequence of equalized frequency domain sub-symbols of SIG-T in the lower frequency band and the sequence of equalized frequency domain sub-symbol of the SIG-T in the upper frequency band and the sequence of the equalized frequency domain sub-symbol of SIG-T in the upper frequency band is computed. The cross correlation is calculated according to the equation $$R_{LU} = \sum_{k_1 \in k_L, k_2 \in k_u} Y(k_1) Y^*(k_2) \quad (12)$$

Wherein $k_l$ is the used subcarrier index of the lower frequency band in the range $$\left[ -\frac{N}{2} : -1 \right],$$

and $k_u$ is the used subcarrier index of the upper frequency band in the range [1:N/2].

In case the primary channel is located at the lower band as detected at step (902) then energy of the sequence of equalized frequency domain sub-symbols of a SIG-T in the lower frequency band is calculated at step (906). The energy of the sequence of equalized frequency domain sub-symbols in th lower frequency band ($E_L$) can be expressed as, $$E_L = \Sigma \forall k_1 \in k_l |Y(k_1)|^2 \quad (13)$$

At step (910), the cross-correlation $R_{LU}$ between the sequence of equalized frequency domain sub-symbols of SIG-T in lower frequency band and the sequence of equalized frequency domain sub-symbols of SIG-T in upper frequency band is compared with the product of the energy ($E_L$) of the sequence of equalized frequency domain sub-symbols of SIG-T in the lower frequency band and the predetermined threshold T. If the cross-correlation is greater than the product, then the offset is identified as CH_OFF_40 or CH_OFF_40_NON_HT_DUP, else the offset is identified as CH_OFF_20L. In an aspect, the presence of a Legacy frame format may be detected by means of a frame format detector, then the channel offset is declared as CH OFF 40 NON HT DUP else it is declared as CH OFF 40.

In case, the primary channel is located at upper band as detected at step (902) then energy ($E_U$) of the equalized frequency domain sub-symbol in the upper frequency band is calculated at step (908). The energy ($E_U$) of the equalized frequency domain sub-symbol in the upper frequency band can be expressed as $$E_U = \sum_{\forall k_2 \in k_u} |Y(k_2)|^2 \quad (14)$$

At step (912), the cross-correlation $R_{LU}$ between the sequence of equalized frequency domain sub-symbols of SIG-T in lower frequency band and the sequence of equalized frequency domain sub-symbols of SIG-T in upper frequency band is compared with the product of the energy $E_u$ of the sequence of equalized frequency domain sub-symbols of SIG-T in upper frequency bandwidth and the predetermined threshold (T). If the cross-correlation is greater than the product then the offset is identified as CH_OFF_40 or CH_OFF_40 NON_HT_DUP, else the offset is identified as CH_OFF_20U. In an aspect, the presence of a Legacy frame format may be detected by means of a frame format detector, then the channel offset is declared as CH_OFF_40_NON_HT_DUP else it is declared as CH_OFF_40.

Figure 10A:
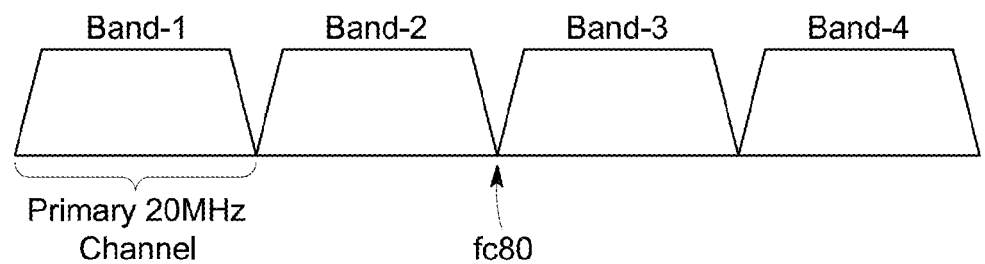
FIGS. 10A, 10B, 10C and 10D illustrate combinations of 20 MHz channel bandwidths for an 80 MHz channel bandwidth with primary 20 MHz channel located at different bands.
Figure 10B:
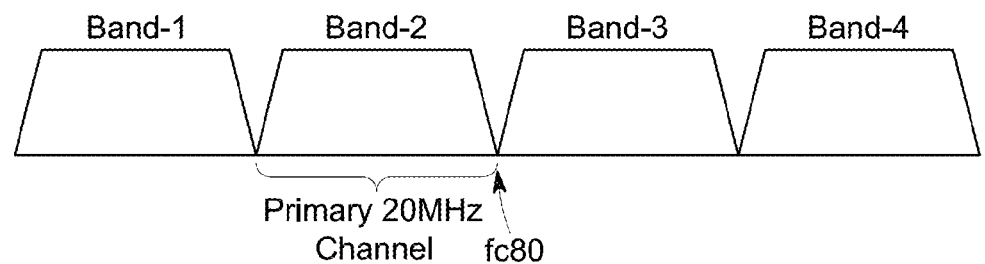
Figure 10C:
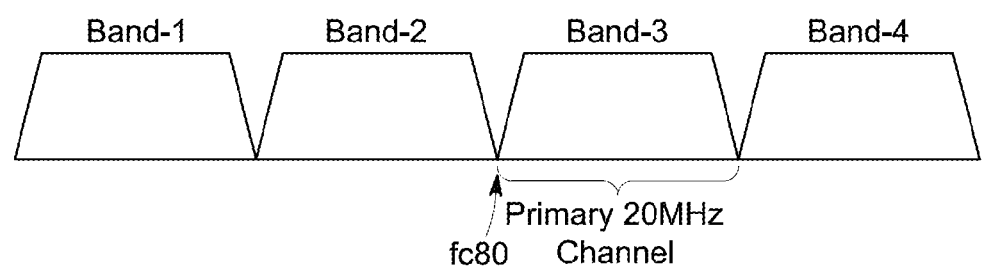
Figure 10D:
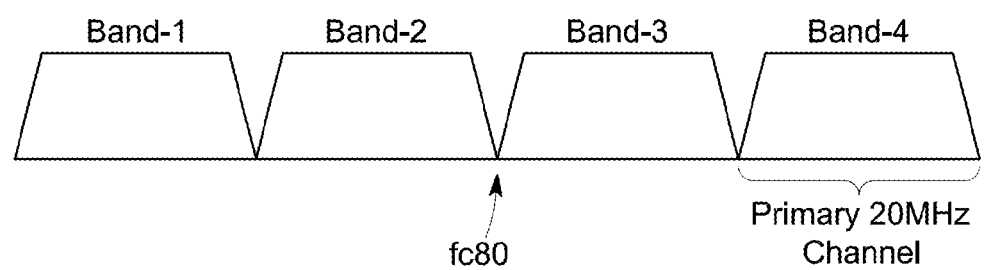

FIGs.10A, 10B, 100 and 10D illustrate various locations of primary 20 MHz channel for an 80 MHz channel bandwidth. In 80 MHz channel bandwidth the primary 20 MHz channel may be located at different bands. FIGS. 10A, 10B, 100 and 10D illustrate four 20 MHz channels marked as Band-1, Band-2, Band-3 and Band-4. The Primary 20 MHz channel in the 80 MHz channel bandwidth may be located in any one of the four bands. For determining the channel bandwidth and the channel offset, there may be four cases. FIG. 10A describes Case 1 when Primary 20 MHz channel is located in Band-1. FIG. 10B describes Case 2 when Primary 20 MHz channel is located in Band-2. FIG. 10C describes Case 3 when Primary 20 MHz channel is located in Band-3. Finally, FIG. 10D describes Case 4 when Primary 20 MHz channel is located in Band-4. The location of the primary 20 MHz channel in 80 MHz channel bandwidth is decided based on $f_c$ and $f_p$.

Figure 11:
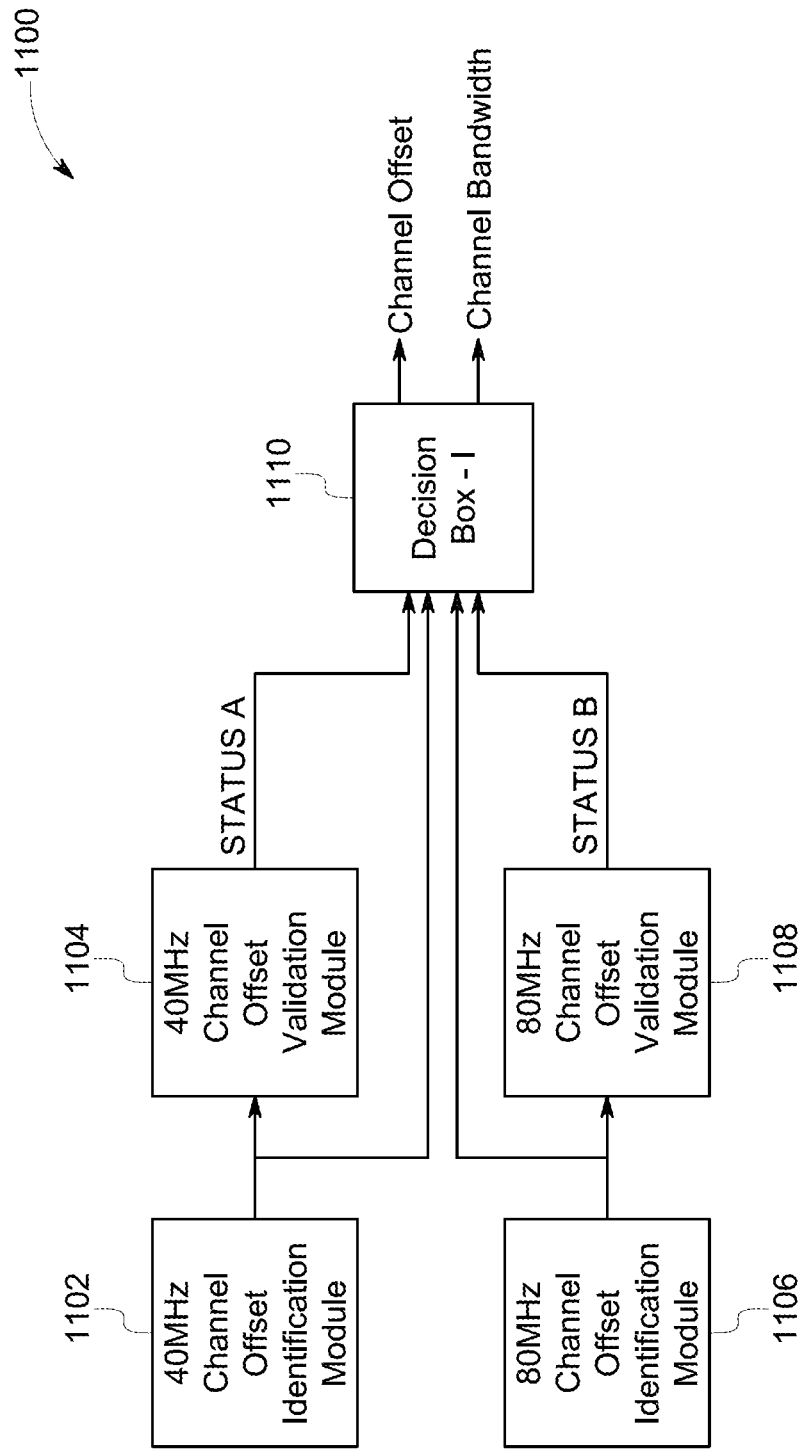
FIG. 11 illustrates a Bandwidth identification Module for a receiver apparatus tuned to RF bandwidth of 80 MHz when the 20 MHz channel is located in Band-1 and Band-4, according to one of the embodiments of the present application.

FIG. 11 illustrates a Bandwidth identification Module (1100) for a receiver apparatus tuned to RF bandwidth of 80 MHz for Case 1 and Case 4, according to one of the embodiments. In Case 1 wherein the primary 20 MHz channel is located in Band-1 and Case 4 wherein the primary 20 MHz channel is located in Band-4 as described in FIG. 10A and FIG. 10D respectively. The Bandwidth identification module (1100) comprises of a first 40 MHz channel offset identification module (1102), a first 40 MHz channel offset validation module (1104), an 80 MHz channel offset identification module (1106), an 80 MHz channel offset validation module (1108) and a Decision Box - I (1110). The 40 MHz channel offset identification module (1102) as described in FIG. 8 determines the channel offset in a 40 MHz channel. The 40 MHz channel offset identification module (1102) determines five channel offset modes namely CH_OFF_20, CH_OFF_40, CH_OFF_20U, CH_OFF_20L and CH_OFF_40_NON_HT_DUP. The 40 MHz validation module validates the channel offset by comparing it with the five possible valid channel offsets i.e. CH_OFF_20, CH_OFF_40, CH_OFF_20U CH_OFF_20L and CH_OFF_40_NON_HT_DUP. In an aspect, the 40 MHz channel offset identification module may receive the sequence of sub symbols Y(k) of the signal from the enhanced channel equalizer, a center frequency index ($f_c$) and a primary channel frequency index ($f_p$) and calculates a channel offset denoted by value or a string of bits. The 40 MHz channel offset validation module may receive the channel offset in terms of value or the string of bits calculated by the 40 MHz channel offset identification module and compare the output with a predetermined string of bits or values that are mapped to the various possible channel offsets to ascertain the channel offset in the received signal. The 80 MHz channel offset identification module (1106) identifies two channel offset modes that may be present in an 80 MHz channel bandwidth namely CH_OFF_80 and CH_OFF_80_NON_HT_DUP. The process for identification the two channel offset modes in 80 MHz channel bandwidth that is followed by the 80 MHz channel offset identification module (1106) is described in FIG. 13. The 80

MHz channel offset validation module (1108) validates the two channel offsets identified by the 80 MHz channel offset identification module (1106). The Decision Box- I (1110) receives the inputs from the 40 MHz channel offset identification module (1102), 40 MHz channel offset validation module (1104), 80 MHz channel offset identification module (1106), and the 80 MHz channel offset validation module (1108) to determine the actual channel bandwidth and channel offset present in the received signal.

For Case-1, the primary 20 MHz channel is located in Band-1, hence, the secondary 20 MHz channel is located in Band-2 as primary and secondary channels are always bounded together. Similarly, for Case-4, the primary 20 MHz channel is located in Band-4; hence, the secondary 20 MHz channel is located in Band-3. For Case-1, the 40 MHz channel offset identification module (1102) receives the signal of 20 MHz channel located in Band-1 and the signal of secondary 20 MHz channel located in Band-2. Likewise for Case-4, the 40 MHz channel offset identification module (1102) receives the signal of 20 MHz channel located in Band-4 and the signal of secondary 20 MHz channel located in Band-3. The 40 MHz channel offset identification module (1102) identifies one of the five possible channel offsets i.e. CH_OFF_20, CH_OFF_40, CH_OFF_20U, CH_OFF_20L, and CH_OFF_40_NON_HT_DUP. Upon the identification of the channel offset, the 40 MHz channel offset validation module (1104) receives the identified channel offset and validates the channel offset by comparing it with five valid channel offsets. The output of the 40 MHz channel offset validation module (1104) is a validation Status A. The status A may be a binary code denoting '1' if the channel offset identified by the 40 MHz channel offset identification module (1102) is valid. Otherwise the status A may be a binary code denoting '0' if the channel offset identified by the 40 MHz channel offset identification module (1102) is not valid. In parallel, the 80 MHz channel offset identification module (1106) receives all the signals present in Band-1, Band-2, Band-3 and Band-4 for identifying one of the two possible channel offsets i.e. CH_OFF_80 and CH_OFF_80_NON_HT_DUP. Upon the identification of the channel offset by the 80 MHz channel offset identification module (1106), the 80 MHz channel offset validation module (1108) receives the identified channel offset and validates the channel offset by comparing it with the two possible valid channel offsets. The output of the 80 MHz channel offset validation module (1108) is a validation Status B. The status B may be a binary code denoting '1' if the channel offset identified by the 80 MHz channel offset identification module (1106) is valid. Otherwise, the status B may be a binary code denoting '0 ' if the channel offset identified by the 80 MHz channel offset identification module (1106) is not valid.

The output of 40 MHz channel offset validation module (1104) and 80 MHz channel offset validation module (1108) i.e. "Status A" and "Status B" respectively is given to Decision Box-I (1110), where Decision Box-I (1110) determines the channel bandwidth and channel offset based on the decision capability as given in Table -1 . In an aspect, the Decision Box-I (1110) may also receive the output of 40 MHz channel offset identification module (1102) and the output of 80 MHz channel offset identification module (1106) for providing the channel bandwidth and channel offset information for demodulation of the received signal chain. In an aspect, if "Status A" is "1" and "Status B" is "0" then output of 40 MHz channel offset identification module (1102) is considered as valid channel offset and used to identify channel bandwidth. For example, if the 40 MHz channel offset identification module (1102) is identified as CH_OFF_20 or CH_OFF_20U or CH_OFF_20L then channel bandwidth is determined as 20 MHz or else channel bandwidth is declared as 40 MHz. In such a scenario, the Decision Box-I (1110) may provide the channel bandwidth as 20 MHz or 40 MHz with valid channel offset given by 40 MHz channel offset identification module (1102). In another aspect, if "Status A" is "0" and "Status B" is "1" then output of 80 MHz channel offset identification module (1106) is considered as valid channel offset and the channel bandwidth is identified as 80 MHz. Table 1 summarizes the conditions for Case 1 and Case 4 as:

TABLE 1

| STATUS A | STATUS B | Decision Box-I |
|---|---|---|
| 1 | 0 | The output of 40 MHz channel offset identification Module is used to identify channel bandwidth. If the 40 MHz channel offset identification module identifies CH_OFF_20, CH_OFF_20L, CH_OFF_20U, then channel bandwidth is declared as 20 MHz or else channel bandwidth is declared as 40 MHz. |
| 0 | 1 | Channel Bandwidth is declared as 80 MHz and valid with channel offset identified by 80 MHz channel offset identification module. |
| 1 | 1 | Error condition |
| 0 | 0 | Error condition |

Figure 12:
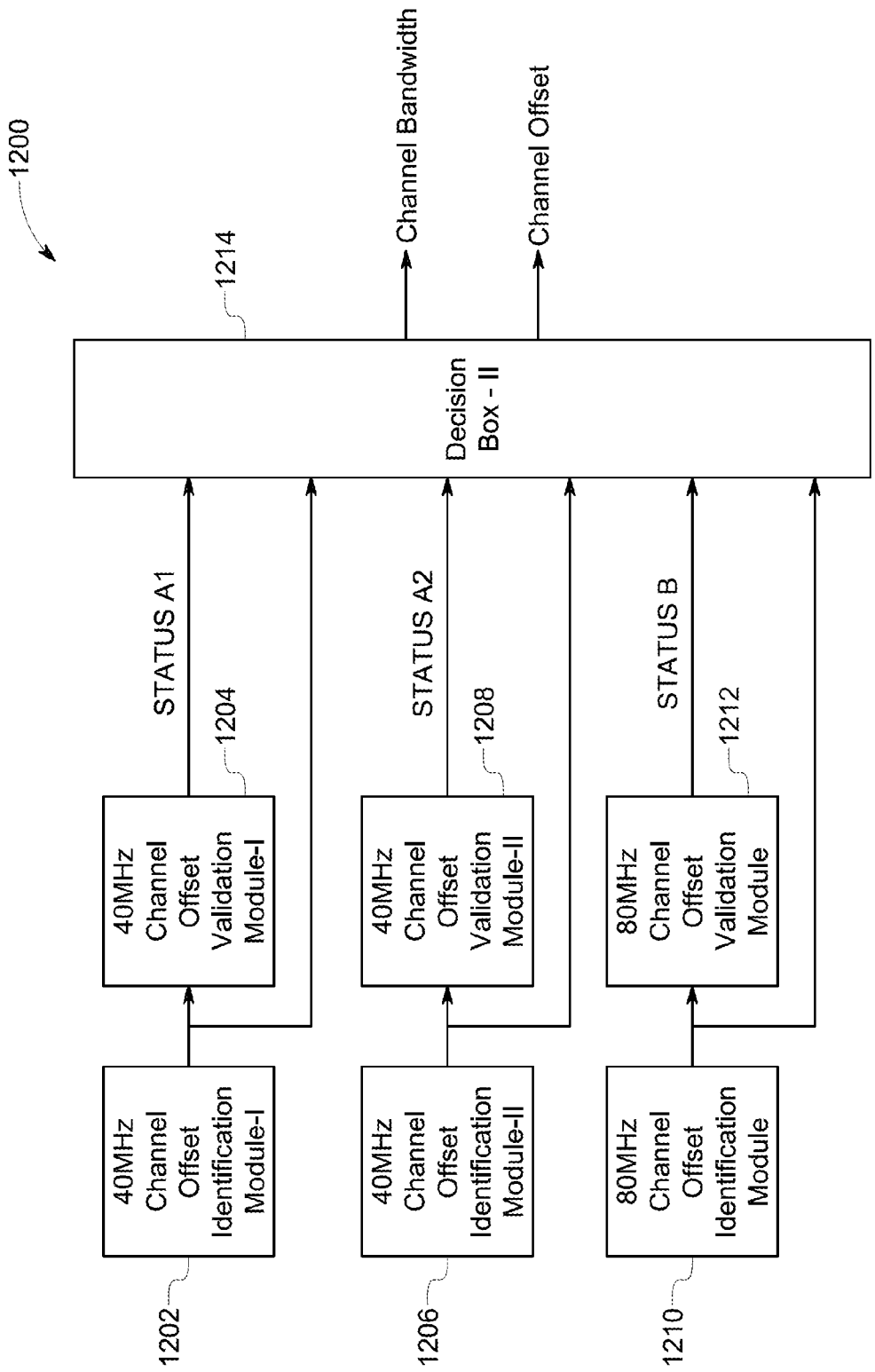
FIG. 12 illustrates a Bandwidth identification Module for a receiver apparatus tuned to RF bandwidth of 80 MHz when the 20 MHz channel is located in Band-2 and Band-3, according to one of the embodiments of the present application.

FIG. 12 illustrates a Bandwidth identification Module (1200) for a receiver apparatus tuned to RF bandwidth of 80 MHz for Case 2 and Case 3, according to one of the embodiments. In Case 2, when the primary 20 MHz channel is located in Band-2 there occur two possibilities either the secondary 20 MHz channel is located in Band-3 or the secondary 20 MHz channel is located in Band-1. Likewise in Case 3, when the primary 20 MHz channel is located in Band-3 there occurs two possibilities either the secondary 20 MHz channel is located in Band-2 or the secondary 20 MHz channel is located in Band-4. The Bandwidth identification Module (1200) determines the channel bandwidth and channel offset in Case-3 and Case-4. Bandwidth identification Module (1200) comprises of a first 40 MHz channel offset identification module referred as 40 MHz channel offset identification module-I (1202), a related first 40 MHz channel offset validation module referred as 40 MHz channel offset validation module-I (1204), a second 40 MHz channel offset identification module referred as 40 MHz channel offset identification module-II (1206), and a related second 40 MHz channel offset validation module referred as 40 MHz channel offset validation module-II (1208). The 40 MHz channel offset identification module-I (1202) and the 40 MHz channel offset identification module-II (1206) are similar to the 40 MHz channel offset identification module described in FIG. 8. The Bandwidth identification Module (1200) also comprises of an 80 MHz channel offset identification (1210), a related 80 MHz channel offset validation module (1212) and a Decision Box-II (1214) as depicted in FIG. 12. The 80 MHz channel offset validation module (1210) identifies two channel offset modes that may be present in an 80 MHz channel bandwidth namely CH_OFF_80 and CH_OFF_80_NON_HT_DUP. The process for determining the two channel offset modes in 80 MHz channel bandwidth that is followed by the 80 MHz channel offset identification module (1210) is described in FIG. 13. The 80 MHz channel offset validation module (1212) validates the two channel offsets identified by the 80 MHz channel offset identification module (1210). The Decision Box-I (1214) receives the inputs from 40 MHz channel offset identification module-I (1202), 40 MHz channel offset validation module-I (1204), 40 MHz channel offset identification module-II (1206), 40 MHz channel offset validation module-II (1208), 80 MHz channel offset identification (1210), and 80 MHz channel offset validation module (1212) to determine the actual channel bandwidth and channel offset present in the received signal.

In Case-2, the signal in the primary 20 MHz channel in Band-2 along with the signal in Band-3 are provided to the 40 MHz channel offset identification module-I (1202). The 40 MHz channel offset identification module-II (1206) receives the signal in the primary 20 MHz channel in Band-2 along with the signal in Band-1.

Likewise in Case 3, the signal in the primary 20 MHz channel in Band-3 along with the signal in Band-2 is provided to the 40 MHz channel offset identification module-I (1202). The 40 MHz channel offset identification module-II (1206) receives the signal in the primary 20 MHz channel in Band-3 along with the signal in Band-4.

The 40 MHz channel offset identification module-I (1202) and the 40 MHz channel offset identification module-II (1206) try to identify the five channel offset modes namely CH_OFF_20, CH_OFF_40, CH_OFF_20U, CH_OFF_20L, and CH_OFF_40_NON_HT_DUP. The output of the 40 MHz channel offset identification module-I (1202) is validated by the related 40 MHz channel offset validation module-I (1204). The output of the 40 MHz channel offset validation module-I (1204) is a validation Status A1. The status A1 may be a binary code denoting '1' if the channel offset identified by the 40 MHz channel offset identification module-I (1202) is valid. Otherwise, the status A1 may be a binary code denoting '0' if the channel offset identified by the 40 MHz channel offset identification module-I (1202) is not valid.

The output of the 40 MHz channel offset identification module-II (1206) is validated by the 40 MHz channel offset validation module-II (1208). The output of the 40 MHz channel offset validation module-II (1208) is a validation Status A2. The status A2 may be a binary code denoting '1' if the channel offset identified by the 40 MHz channel offset identification module-II (1206) is valid. Otherwise, the status A2 may be a binary code denoting '0' if the channel offset identified by the 40 MHz channel offset identification module-II (1206) is not valid.

In parallel, the 80 MHz channel offset identification module (1210) receives all the signals present in Band-1, Band-2, Band-3 and Band-4 for identifying one of the two possible channel offsets i.e. CH_OFF_80 and CH_OFF_80_NON_HT_DUP. Upon the identification of the channel offset by the 80 MHz channel offset identification module (1210), the 80 MHz channel offset validation module (1212) receives the identified channel offset and validates the channel offset by comparing it with the two possible valid channel offsets. The output of the 80 MHz channel offset validation module (1212) is a validation Status B. The status B may be a binary code denoting '1' if the channel offset identified by the 80 MHz channel offset identification module (1210) is valid. Otherwise, the status B may be a binary code denoting '0' if the channel offset identified by the 80 MHz channel offset identification module (1210) is not valid.

The output of 40 MHz channel offset validation module-I (1204), 40 MHz channel offset validation module-II (1208) and 80 MHz channel offset validation module (1212) i.e. "Status A1", "Status A2" and "Status B" respectively are given to Decision Box-II (1214), where Decision Box-II determines the channel bandwidth and channel offset based on the decision capability as given in Table-2.

TABLE 2

| Status A1 | Status A2 | Status B | DECISION BOX-II |
|---|---|---|---|
| 1 | 0 | 0 | The output of 40 MHz channel offset identification Module -I is used to identify channel bandwidth. If the 40 MHz channel offset identification module-I identifies CH_OFF_20, CH_OFF_20L, CH_OFF_20U, then channel bandwidth is declared as 20 MHz or else channel bandwidth is declared as 40 MHz. |
| 0 | 1 | 0 | The output of 40 MHz channel offset identification Module-II is used to identify channel bandwidth. If the 40 MHz channel offset identification module-II identifies CH_OFF_20, CH_OFF_20L, CH_OFF_20U, then channel bandwidth is declared as 20 MHz or else channel bandwidth is declared as 40 MHz. |
| 0 | 0 | 1 | Channel bandwidth is declared as 80 MHz with channel offset identified by 80 MHz channel offset identification module. |
| 1 | 1 | 0 | Error condition |
| 0 | 0 | 0 | Error condition |
| 0 | 1 | 1 | Error condition |
| 1 | 0 | 1 | Error condition |
| 1 | 1 | 1 | Error condition |

Figure 13:
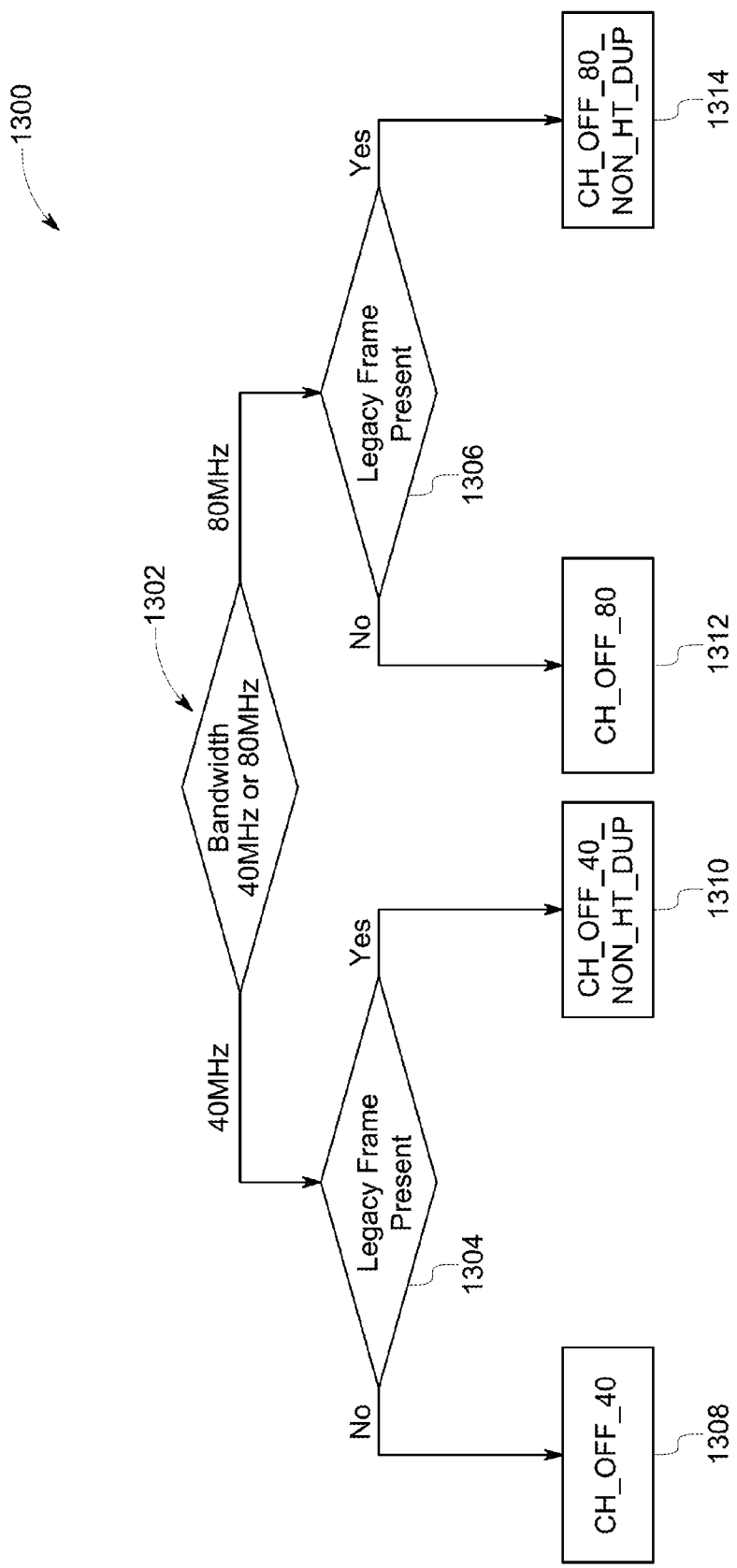
FIG. 13 illustrates a flowchart describing a method step for distinctly identifying the CH_OFF_40 or CH_OFF_40_NON_HT_DUP channel offsets and CH_OFF_80 or CH_OFF_80_NON_HT_DUP channel offsets.

FIG. 13 illustrates a flowchart describing a method step for distinctly identifying the CH_OFF_40 or CH_OFF_40_NON_HT_DUP channel offsets and CH_OFF_80 or CH_OFF_80_NON_HT_DUP channel offsets. Initially, the cyclic prefix is removed, OFDM demodulation is performed and channel equalization is performed on the retrieved Sig-T also referred to as signal field. At step (1302), the channel bandwidth of the signal is identified as described above. In case, the channel bandwidth is 40 MHz then at step (1304) a legacy frame format detector detects the presence of a legacy frame. In case, the presence of a legacy frame is confirmed then at step (1310) the channel offset is identified as "CH_OFF_40_NON_HT_DUP". Otherwise if, the presence of a legacy frame is not confirmed then at step (1308) the channel offset is identified as "CH_OFF_40". A similar approach is followed for determining the difference between the CH_OFF_80 and CH_OFF_80_NON_HT_DUP channel offsets. In case, the channel bandwidth is 80 MHz then at step (1306) a legacy frame format detector detects the presence of a legacy frame. In case, the presence of a legacy frame is confirmed then at step (1314) the channel offset is identified as "CH_OFF_80_NON_HT_DUP". Otherwise if, the presence of a legacy frame is not confirmed then at step (1312) the channel offset is identified as "CH_OFF_80". Finally, the remaining part of the received PPDU may be decoded with the information regarding the channel bandwidth and channel offset by the data mode module (616).

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for identifying a channel bandwidth and channel offset of a transmitted orthogonal frequency division multiplexing signal by a receiver having Radio Frequency (RF) bandwidth tuned to 40 MHz, comprising:
   receiving one or more orthogonal frequency division multiplexing signals, wherein each of the one or more orthogonal frequency division multiplexing signals have an associated center frequency index, a primary channel frequency index and a Physical Layer (PHY) protocol data unit having a training field, a signal field and a data field;
   identifying a location of a primary channel by comparing the center frequency index with the primary channel frequency index, and if the center frequency index is greater than the primary channel frequency index then the primary channel is located at a lower band or else if the center frequency index is lesser than the primary channel frequency index then the primary channel is located at an upper band;
   determining a sequence of equalized frequency domain sub-symbols of the signal field in a lower frequency band and a sequence of equalized frequency domain sub-symbols of the signal field in an upper frequency band;
   computing a cross-correlation between the sequence of equalized frequency domain sub-symbols of the signal field in the lower frequency band and the sequence of equalized frequency domain sub-symbols of the signal field in the upper frequency band;
   in case, the primary channel is located at the lower band then
   computing energy of the sequence of equalized frequency domain sub-symbols of the signal field in the lower frequency band; and
   comparing the cross-correlation between the sequence of equalized frequency domain sub-symbols of the signal field in the lower frequency band and the sequence of equalized frequency domain sub-symbols of the signal field in the upper frequency band with a product of the energy of the sequence of equalized frequency domain sub-symbols of the signal field in the lower frequency band and the predetermined threshold, if the cross-correlation between the sequence of equalized frequency domain sub-symbols of the signal field in the lower frequency band and the sequence of equalized frequency domain sub-symbols of the signal field in the upper frequency band is greater than the product, then the channel offset is identified as a first channel offset mode CH_OFF_40 or a second channel offset mode CH_OFF_40_NON_HT_DUP, else the channel offset is identified as a third channel offset mode CH_OFF_20L;
   in case, the primary channel is located at the upper band, then
   computing energy of the sequence of equalized frequency domain sub-symbols of the signal field in the upper frequency band; and
   comparing the cross-correlation between the sequence of equalized frequency domain sub-symbols of the signal field in the lower frequency band and the sequence of equalized frequency domain sub-symbols of the signal field in the upper frequency band with a product of the energy of the sequence of equalized frequency domain sub-symbols of the signal field in the upper frequency band and the predetermined threshold, if the cross-correlation is greater than the product then the channel offset is identified as the first channel offset mode CH_OFF_40 or the second channel offset mode CH_OFF_40_NON_HT_DUP, else the channel offset is identified as a fourth channel offset mode CH_OFF_20U; and
   demodulating one or more orthogonal frequency division multiplexing signals based on the identified channel bandwidth and channel offset.

2. The method as claimed in claim 1, wherein if the channel offset is identified as the first channel offset mode CH_OFF_40 or the second channel offset mode CH_OFF_40_NON_HT_DUP then the channel bandwidth is 40 MHz.

3. The method as claimed in claim 1, wherein if the channel offset is identified as third channel offset mode CH_OFF_20L or the fourth channel offset mode CH_OFF_20U then the channel bandwidth is 20 MHz.

4. The method as claimed in claim 1, further comprising a step of detecting a Legacy frame format wherein if a Legacy frame is detected then the channel offset is second channel offset mode CH_OFF_40_NON_HT_DUP else the channel offset is first channel offset mode CH_OFF_40.

5. The method as claimed in claim 1, wherein the signal field in the PHY protocol data unit is Legacy-signal field (L-SIG) in case of Legacy Non-hiqh throughput (Non-HT) frame format, High Throughput mixed mode (HT-MM) frame format, and Very High Throughput (VHT) frame format or the signal field is first symbol of High throughput-signal (HT-SIG) in case of HT Greenfield (HT-GF) frame format.

6. The method as claimed in claim 1, wherein the cross-correlation between the sequence of equalized frequency domain sub-symbols of the signal field in the lower frequency band and the sequence of equalized frequency domain sub-symbols of the signal field in the upper frequency band is computed based on $R_{LU}=\Sigma_{k_1}531_{k_1k_2}\in_{k_u}Y(k_1)Y^*(k_2)$, wherein $R_{LU}$ is the cross-correlation between the sequence of equalized frequency domain sub-symbols of the signal field in the lower frequency band and the sequence of equalized frequency domain sub-symbols of the signal field in the upper frequency band, $Y(k)$ is the sub-symbol of the signal field, $k_l$ are the used subcarrier indexes of lower frequency band in the range of $$\left[-\frac{N}{2}:-1\right],$$

and $k_u$ are the used subcarrier indexes of upper frequency band in the range of [1:N/2], and N is Fast Fourier transform (FFT) size.

7. The method as claimed in claim 1, wherein the energy of the sequence of equalized frequency domain sub-symbols of the signal field in the lower frequency band is computed based on $E_L=\Sigma_{\forall k\in k_l}|Y(k)|^2$, wherein $E_L$ is the energy of the sequence of equalized frequency domain sub-symbols of the signal field in the lower frequency band, $k_l$ are the used subcarrier indexes of lower frequency band in the range of $$\left[-\frac{N}{2}:-1\right].$$

8. The method as claimed in claim 1, wherein the energy of the sequence of equalized frequency domain sub-symbols in the upper frequency band is computed by a Frequency Domain Energy Computation module based on $E_u=\Sigma_{\forall k\in k_u}|Y(k)|^2$, wherein $E_u$ is the energy of the sequence of equalized frequency domain sub-symbols of signal field in the upper frequency band, $k_u$ are the used subcarrier indexes of upper frequency band in the range of [1:N/2].

9. An apparatus for identifying a channel bandwidth and channel offset of an orthogonal frequency division multiplexing signal when Radio Frequency (RF) bandwidth is tuned to 40 MHz, comprising:
 a receiving unit that receives one or more orthogonal frequency division multiplexing signals, by means of one or more antennas, wherein each of the one or more orthogonal frequency division multiplexing signals have an associated center frequency index, a primary channel frequency index and a Physical Layer (PHY) protocol data unit, and wherein the PHY protocol data unit comprises of a training field, a signal field and a data field;
 a 40 MHz channel offset identification module executed by a processor that identifies the channel offset, wherein the 40 MHz channel offset identification module comprises of:
  a primary channel identification module executed by the processor that identifies a location of a primary Channel by comparing the center frequency index and the primary channel frequency index, if the center frequency index is greater than the primary channel frequency index then the primary channel is located at a lower band or else if the center frequency index is lesser than the primary channel frequency index then the primary channel is located at an upper band;
  a Frequency Domain Cross correlation Computation module executed by the processor that computes a cross-correlation between a sequence of equalized frequency domain sub-symbols of the signal field in a lower frequency band and a sequence of equalized frequency domain sub-symbols of the signal field in an upper frequency band;
  a Frequency Domain Energy Computation module executed by the processor, that computes energy of the sequence of equalized frequency domain sub-symbols of the signal field in the lower frequency band, if, the primary channel is located at the lower band, or else computes the Energy of the sequence of equalized frequency domain sub-symbols of the signal field in the upper frequency band, if, the primary channel is located at the upper band; and
  a Cross correlation and Energy comparator module executed by the processor that compares the cross-correlation between the sequence of equalized frequency domain sub-symbols of the signal field in the lower frequency band and the sequence of equalized frequency domain sub-symbols of the signal field in the upper frequency band with the product of the energy of the sequence of equalized frequency domain sub-symbols of the signal field in the lower frequency band and the predetermined threshold, if, the primary channel is located at the lower band, wherein if the cross-correlation is greater than the product, then the channel offset is identified as first channel offset mode CH_OFF_40 or second channel offset mode CH_OFF_40_NON_HT_DUP, else the channel offset is identified as third channel offset mode CH OFF_20L, or else the Cross correlation and Energy comparator module compares the cross-correlation between the sequence of equalized frequency domain sub-symbols of the signal field in the lower frequency band and the sequence of equalized frequency domain sub-symbols of the signal field in the upper frequency band with the product of the energy of the sequence of equalized frequency domain sub-symbols of the signal field in the upper frequency band and the predetermined threshold, if, the primary channel is located at the upper band, wherein if the cross-correlation is greater than the product then the channel offset is identified as the first channel offset mode CH_OFF_40 or the second channel offset mode CH_OFF_40_NON_HT_DUP, else the channel offset is identified as fourth channel offset mode CH OFF_20U and
 a data mode module executed by the processor that demodulates the received one or more orthogonal frequency division multiplexing signals based on the identified channel bandwidth and channel offset.

10. The apparatus as claimed in claim 9, wherein the wireless receiver apparatus is based on OFDM and compliant is to any one of IEEE802.11a, IEEE802.11n and IEEE802.11 ac standards.

11. The apparatus as claimed in claim 9, wherein the orthogonal frequency division multiplexing system is a multiple-input and multiple-output system.

12. The apparatus as claimed in claim 9, wherein the orthogonal frequency division multiplexing system is a single-input and single-output system.

13. A method for identifying a channel bandwidth and channel offset of a transmitted orthogonal frequency division multiplexing signal by a receiver having Radio Frequency (RF) bandwidth tuned to 80 MHz comprising:

receiving one or more orthogonal frequency division multiplexing signals, wherein each of the one or more orthogonal frequency division multiplexing signals have a center frequency index, a primary channel frequency index and a Physical Layer (PHY) protocol data unit having a training field, a signal field and a data field;

identifying a location of a primary channel by comparing the center frequency index with the primary channel frequency index;

determining one or more 40 MHz channel offset and one or more 80 MHz channel offset based on the location of the primary channel, wherein determining 40 MHz channel offset comprises of:

determining a sequence of equalized frequency domain sub-symbols of the signal field in a lower frequency band and a sequence of equalized frequency domain sub-symbols of the signal field in an upper frequency band;

computing a cross-correlation between the sequence of equalized frequency domain sub-symbols of the signal field in the lower frequency band and the sequence of equalized frequency domain sub-symbols of the signal field in the upper frequency band;

in case, the primary channel is located at lower band then computing energy of the sequence of equalized frequency domain sub-symbols of the signal field in the lower frequency band; and comparing the cross-correlation between the sequence of equalized frequency domain sub-symbols of the signal field in the lower frequency band and the sequence of equalized frequency domain sub-symbols of the signal field in the upper frequency band with a product of the energy of the sequence of equalized frequency domain sub-symbols of the signal field in the lower frequency band and the predetermined threshold, if the cross-correlation between the sequence of equalized frequency domain sub-symbols of the signal field in the lower frequency band and the sequence of equalized frequency domain sub-symbols of the signal field in the upper frequency band is greater than the product, then the channel offset is identified as a first channel offset mode CH_OFF_40 or a second channel offset mode CH_OFF_40 NON_HT_DUP, else the channel offset is identified as a third channel offset mode CH_OFF_20L;

in case, the primary channel is located at upper band, then computing energy of the sequence of equalized frequency domain sub-symbols of the signal field in the upper frequency band; and comparing the cross-correlation between the sequence of equalized frequency domain sub-symbols of the signal field in the lower frequency band and the sequence of equalized frequency domain sub-symbols of the signal field in the upper frequency band with a product of the energy of the sequence of equalized frequency domain sub-symbols of the signal field in the upper frequency band and the predetermined threshold, if the cross-correlation is greater than the product then the channel offset is identified as the first channel offset mode CH_OFF_40 or the second channel offset mode CH_OFF_40 NON_HT_DUP, else the channel offset is identified as a fourth channel offset mode CH_OFF_20U;

determining the channel offset by validating the 40 MHz channel offset and the 80 MHz channel offset;

if the 40 MHz channel offset is valid then the channel offset of the signal is the first channel offset mode CH_OFF_40, the second channel offset mode CH_OFF_40_NON_HT_DUP, the third channel offset mode CH_OFF_20L the fourth channel offset mode CH_OFF_20U;

else if the 80 MHz channel offset is valid then the channel offset of the signal is a fifth channel offset mode CH_OFF_80 or a sixth channel offset mode CH_OFF_80 NON_HT_DUP; and demodulating one or more orthogonal frequency division multiplexing signals based on the identified channel bandwidth and channel offset.

14. The method as claimed in claim 13, further comprising a step of detecting a Legacy frame format wherein if the channel offset is the sixth channel offset mode CH_OFF_80 NON_HT_DUP or the fifth channel offset mode CH_OFF_80 and a legacy frame is detected then the channel offset is the sixth channel offset mode CH_OFF_80_NON_HT_DUP_else the channel offset is the fifth channel offset mode CH_OFF_80.

15. The method as claimed in claim 13, wherein if the channel offset is identified as the fifth channel offset mode CH_OFF_80 or the sixth channel offset mode CH_OFF_80_NON_HT_DUP then the channel bandwidth is 80 MHz.

16. The method as claimed in claim 13, wherein if the channel offset is identified as the first channel offset mode CH_OFF_40 or the second channel offset mode CH_OFF_40_NON_HT_DUP then the channel bandwidth is 40 MHz.

17. The method as claimed in claim 13, wherein if the channel offset is identified as the third channel offset mode CH_OFF_20L or the fourth channel offset mode CH_OFF_20U then the channel bandwidth is 20 MHz.

18. An apparatus for identifying a channel bandwidth and channel offset of an orthogonal frequency division multiplexing signal when Radio Frequency (RF) bandwidth is tuned to 80 MHz, comprising: a receiving unit, a first 40 MHz channel offset identification module, a second 40 MHz channel offset identification module, a first 40 MHz channel offset validation module, a second 40 MHz channel offset validation module, a 80 MHz channel offset identification module, a 80 MHz channel offset validation module, a decision box wherein:

the receiving unit receives one or more orthogonal frequency division multiplexing signals, by means of one or more antennas, wherein each of the one or more orthogonal frequency division multiplexing signals have an associated center frequency index, a primary channel frequency index and a Physical Layer (PHY) protocol data unit, and wherein the PHY protocol data unit comprises of a training field, a signal field and a data field;

the first 40 MHz channel offset identification module executed by a processor identifies a first 40 MHz channel offset mode;

the first 40 MHz channel offset validation module executed by the processor validates the output of the first 40 MHz channel offset identification module;

the second 40 MHz channel offset identification module executed by the processor identifies a second 40 MHz channel offset mode;

the second 40 MHz channel offset validation module executed by the processor validates the output of the second 40 MHz channel offset identification module, wherein the 40 MHz channel offset identification module and the second 40 MHz channel offset validation module are activated when the primary channel is located in a second 20 MHz channel or a third 20 MHz channel of the received signal;

the 80 MHz channel offset identification module executed by the processor identifies a 80 MHz channel offset mode;

the 80 MHz channel offset validation module executed by the processor validates the output of the 80 MHz channel offset identification module; and the decision box executed by the processor receives the outputs from the first 40 MHz channel offset identification module, the second 40 MHz channel offset identification module, the first 40 MHz channel offset validation module, the second 40 MHz channel offset validation module, the 80 MHz channel offset identification module and the 80 MHz channel offset validation module and identifies the valid channel offset; and a data mode module executed by the processor demodulates the received one or more orthogonal frequency division multiplexing signals based on the identified channel bandwidth and channel offset.

19. The apparatus as claimed in claim 18, wherein the received signal is a combination of four 20 MHz channels comprising a first 20 MHz channel, the second 20 MHz channel, the third 20 MHz channel, and a fourth 20 MHz channel.

* * * * *